(12) United States Patent
Umehara

(10) Patent No.: US 11,519,717 B2
(45) Date of Patent: Dec. 6, 2022

(54) FILM THICKNESS MEASURING SYSTEM AND FILM THICKNESS MEASURING METHOD

(71) Applicant: Tokyo Electron Limited, Tokyo (JP)

(72) Inventor: Yasutoshi Umehara, Tokyo (JP)

(73) Assignee: Tokyo Electron Limited, Tokyo (JP)

( * ) Notice: Subject to any disclaimer, the term of this patent is extended or adjusted under 35 U.S.C. 154(b) by 93 days.

(21) Appl. No.: 17/196,033

(22) Filed: Mar. 9, 2021

(65) Prior Publication Data

US 2021/0293531 A1  Sep. 23, 2021

(30) Foreign Application Priority Data

Mar. 17, 2020  (JP) .............................. JP2020-046597

(51) Int. Cl.
*G01B 11/06* (2006.01)
(52) U.S. Cl.
CPC ................................ *G01B 11/0625* (2013.01)
(58) Field of Classification Search
CPC ................................................. G01B 11/0625
See application file for complete search history.

(56) References Cited

U.S. PATENT DOCUMENTS 9,355,442 B2 * 5/2016 Iwanaga ................ G06T 7/0004
2020/0386538 A1 * 12/2020 Nakamura ......... G01B 11/0616

FOREIGN PATENT DOCUMENTS

JP       2015-215193         12/2015
WO    WO-2006073063 A1 *  7/2006  ............. G01B 15/02

* cited by examiner

*Primary Examiner* — Rebecca C Bryant
(74) *Attorney, Agent, or Firm* — IPUSA, PLLC

(57) ABSTRACT

A film thickness measuring system measures thicknesses of first films of respective first substrates by spectroscopy, captures first image data of surfaces of second substrates each having a second film to acquire first color information of the surfaces of the second substrates, and calculates a correlation between a thickness of the second film and color information of the surface of the second substrate by using the measured thickness of the first films and the first color information. When estimating a thickness of a third film of a third substrate, the film thickness measuring system acquire second color information of the surface of the third substrate by using captured image data of the third substrate, and estimates a thickness of the third film in the second region, by using the calculated correlation and the second color information.

9 Claims, 16 Drawing Sheets

FILM THICKNESS MEASURING SYSTEM AND FILM THICKNESS MEASURING METHOD

CROSS-REFERENCE TO RELATED APPLICATIONS

This patent application is based upon and claims priority to Japanese Patent Application No. 2020-046597 filed on Mar. 17, 2020, the entire contents of which are incorporated herein by reference.

TECHNICAL FIELD

The present disclosure relates to a film thickness measuring system, a film thickness measuring method, and a program.

BACKGROUND

Patent Document 1 discloses a structure for calculating the thickness of a film formed on a substrate from an image on which a substrate surface is imaged.

RELATED ART DOCUMENT

Patent Document

[Patent Document 1] Japanese Laid-open Patent Application Publication No. 2015-215193

SUMMARY

The present disclosure provides a film thickness measuring system, film thickness measuring method and program capable of accurately measuring the thickness of films on a substrate on which a pattern is formed.

A film thickness measuring system according to one aspect of the present disclosure includes a holder configured to hold a substrate; an imaging device configured to capture image data of a surface of the substrate held by the holder; and a controller. The film thickness measuring system estimates a thickness of a film formed on a third substrate by using N number of first substrates having respective first films with different thicknesses (N is an integer greater than 1), and N number of second substrates on which second films are formed. The thicknesses of the second films correspond to thicknesses of the respective first films. First, the controller receives, for each of the N number of first substrates, spectral data of light reflected at a first position on a surface of a corresponding first substrate of the first substrates; and calculates a thickness of each of the first films at the first position by using the spectral data. Next, the controller causes the imaging device to capture first image data of surfaces of the N number of second substrates, and acquires, for each of the N number of second substrates, first color information of multiple first sub-regions in a first region in a corresponding second substrate by using the first image data, the first region including a second position corresponding to the first position. Next, the controller calculates, for each of the multiple first sub-regions, a correlation between a film thickness and color information, by using the calculated thickness of each of the first films at the first location as the thickness of each of the second films in the first region and by using the first color information of the N number of second substrates. Next, the controller causes the imaging device to capture second image data of a surface of the third substrate on which a third film is formed, and acquires second color information of a multiple second sub-regions in a second region on the third substrate by using the second image data, the second region corresponding to the first region, and the multiple second sub-regions corresponding to the multiple first sub-regions. Finally, the controller estimates a thickness of the third film in the second region, by using the calculated correlation and the second color information of the multiple second sub-regions.

DESCRIPTION OF EMBODIMENTS

Hereinafter, embodiments will be described in detail with reference to the accompanying drawings. In the present specification and the drawings, the same reference symbol is assigned to components having substantially the same functional structures, and duplicate description may be omitted.

[Substrate Processing System]

First, a substrate processing system will be described. The substrate processing system is a system for depositing a film, such as a silicon nitride film, on a substrate. A substrate to be processed is, for example, a semiconductor wafer W. FIG.

1 is a schematic diagram illustrating an example of a schematic configuration of a substrate processing system.

The substrate processing system 20 is located in a clean room, and, for example, four process modules $PM_1$, $PM_2$, $PM_3$, and $PM_4$, and two load lock modules $LLM_a$ and $LLM_b$, are clustered, around a generally pentagonal-shaped platform or vacuum transport chamber PH extending in the depth direction of the substrate processing system 20. Although illustration is omitted, the substrate processing system 20 includes a system controller for overall control of operations of an entirety of the substrate processing system 20.

Figure 1:
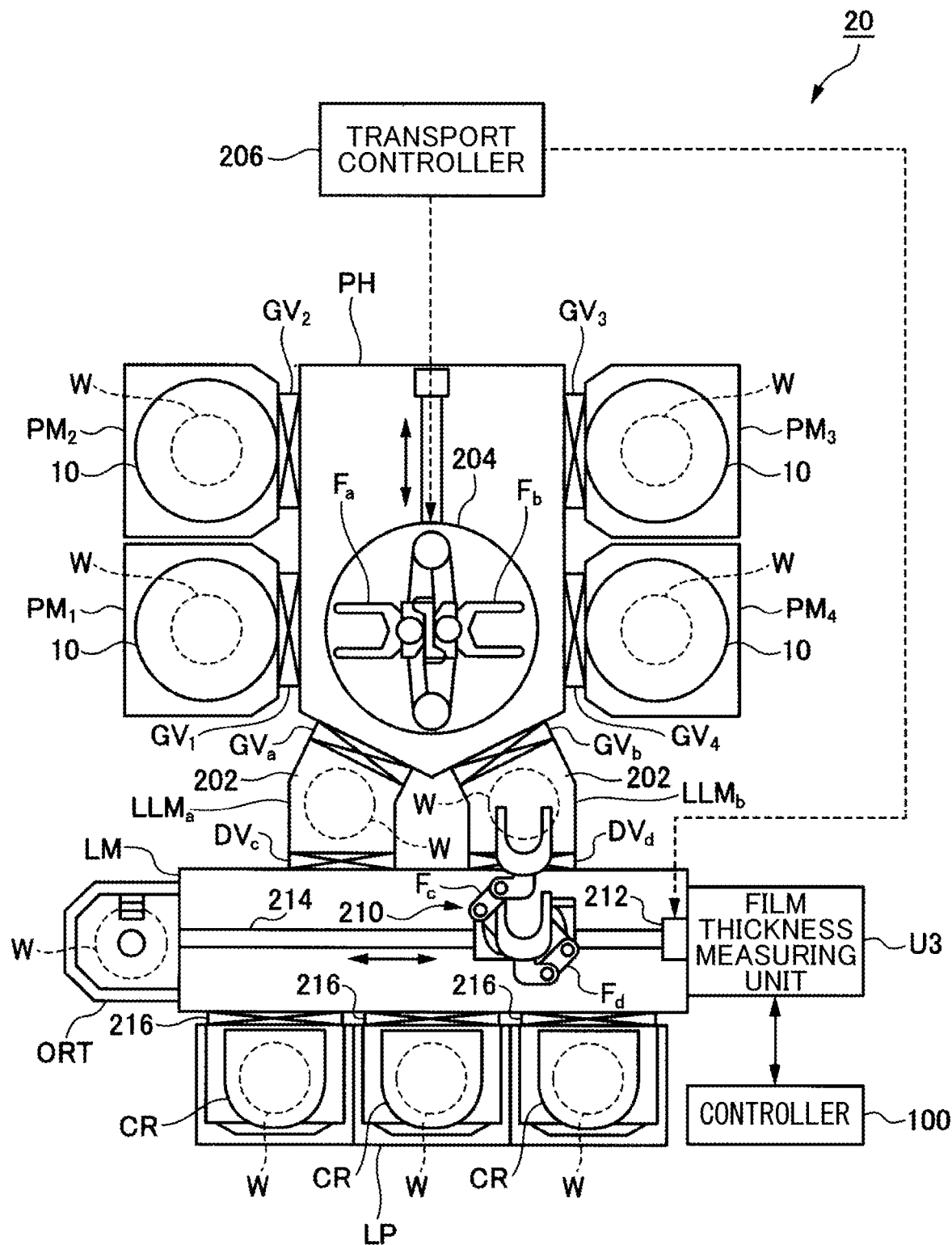
FIG. 1 is a schematic diagram illustrating an example of the schematic configuration of a substrate processing system.

More specifically, two process modules $PM_1$ and $PM_2$ are connected to the left longer side of the vacuum transport chamber PH in FIG. 1 via gate valves $GV_1$ and $GV_2$, respectively, two process modules $PM_3$ and $PM_4$ are connected to the right longer side of the vacuum transport chamber PH in FIG. 1 via gate valves $GV_3$ and $GV_4$, respectively, and $LLM_a$ and $LLM_b$ are connected to a pair of shorter sides of a v-shape, which is provided at the lower portion of the vacuum transport chamber PH in FIG. 1, via gate valves $GV_a$ and $GV_b$, respectively.

Each of the process modules $PM_1$, $PM_2$, $PM_3$, and $PM_4$ includes a vacuum chamber 10, the inside of which is maintained at a decompressed state by a dedicated exhaust device (not illustrated) capable of controlling pressure, and is typically configured such that a wafer W is placed on a stage or susceptor (not illustrated) disposed at the center of the vacuum chamber 10 and that a desired film is deposited on the wafer W using predetermined available resources (e.g., process gas, power, and decompression).

The load-lock module $LLM_a$ and the load-lock module $LLM_b$ are capable of communicating with an atmospheric transport chamber of a loader transport chamber LM, which will be described below, via the door valves $DV_c$ and $DV_d$, respectively. In a load-lock chamber 202 of each of the load-lock modules $LLM_a$ and $LLM_b$, a mount or delivery table (not illustrated) for temporarily retaining a wafer W transferred between the loader transport chamber LM and the vacuum transport chamber PH is provided.

The vacuum transport chamber PH is connected to a dedicated vacuum evacuation device (not illustrated), and the interior of the vacuum transport chamber PH is normally maintained at a constant reduced pressure at all times. Inside the vacuum transport chamber PH, a pair of telescopic conveying arms $F_a$ and $F_b$ is provided, and a single-wafer vacuum conveying robot 204 capable of sliding, swiveling, and lifting is provided. The vacuum conveying robot 204 moves between the process modules $PM_1$ to PM: and the load-lock modules $LLM_a$ and $LLM_b$ to transport a wafer W one by one, in accordance with commands from a transport controller 206.

Load ports LP, an alignment mechanism ORT, and a film thickness measuring unit U3 are provided adjacent to the loader transport chamber LM. The load port LP is used to load and unload a wafer cassette CR that can accommodate, for example, 25 wafers W per batch, between an external carrier vehicle and the load port LP. Here, the wafer cassette CR is configured as a front-opening unified pod (FOUP) or a standard mechanical interface (SMIF) box. The alignment mechanism ORT is used to align the notch or the orientation flat of a wafer W to a predetermined position or orientation. The film thickness measuring unit U3 measures the thickness of the films formed on each of the processed wafers W deposited in one of the process modules $PM_1$ to $PM_4$ and returned to the loader transport chamber LM, or measures the thicknesses of the films on processed wafers W that are periodically sampled.

A single-wafer atmospheric conveying robot 210 provided in the loader conveying chamber LM includes a pair of conveying arms $F_c$ and $F_d$ that can be expanded and contracted. The atmospheric conveying robot 210 can move horizontally on a linear guide 214 of a linear motor 212, can move up and down, and can be rotated. The atmospheric conveying robot 210 moves between the load port LP, the alignment mechanism ORT, the load lock modules $LLM_a$ and $LLM_b$, and the film thickness measuring unit U3, to transport a wafer W one by one in accordance with a command from the transport controller 206.

A basic wafer transfer sequence, for having a wafer in the wafer cassette CR loaded into the load port LP undergo a series of processes in the substrate processing system 20, will be described.

The atmospheric conveying robot 210 in the loader transport chamber LM unloads a single wafer W from the wafer cassette CR on the load port LP while the LP door 216 is opened, and transports the wafer W to the alignment mechanism ORT for alignment. After the alignment, the atmospheric conveying robot 210 transfers the wafer W to one of the load lock modules $LLM_a$ and $LLM_b$. In the following, a case in which the wafer is transferred to the load lock module $LLM_a$ will be described. The load lock module $LLM_a$ receives the wafer W under atmospheric pressure, evacuate the inside of the load lock module $LLM_a$ after receiving the wafer W, and passes the semiconductor wafer W to the vacuum conveying robot 204 in the vacuum transport chamber PH under a decompressed state.

In the substrate processing system 20, as an example of the system configuration, all of the four process modules $PM_1$ to $PM_4$ employ a deposition apparatus of the same model, and the same deposition process in accordance with the same recipe can be performed in all of the process modules $PM_1$ to $PM_4$.

The vacuum conveying robot 204 loads a wafer W having been unloaded from the load-lock module $LLM_a$ into one of the process modules $PM_1$ to $PM_4$, by using one of the conveying arms $F_a$ and $F_b$. Within the process module of the process modules $PM_1$ to $PM_4$, into which the wafer W is loaded, a deposition process is performed under predetermined process conditions (e.g., gas, pressure, power, and time), in accordance with a predetermined recipe. After the deposition process is completed, the vacuum conveying robot 204 unloads the wafer W from the process module of the process modules $PM_1$ to $PM_4$, and transfers the wafer W to one of the load-lock modules $LLM_a$ and $LLM_b$.

When the wafer W to which the deposition process has been applied is loaded into, for example, the load-lock module $LLM_b$, the state of the interior of the load-lock module $LLM_b$ is switched from a decompressed state to an atmospheric pressure state. Thereafter, the atmospheric conveying robot 210 in the loader transport chamber LM unloads the wafer W from the load-lock module $LLM_b$ at the atmospheric pressure state, and loads the processed wafer W into the film thickness measuring unit U3.

Then, when the film thickness measuring unit U3 completes measurement or evaluation of the wafer W, the atmospheric conveying robot 210 unloads the wafer W from the film thickness measuring unit U3, and returns the wafer W to the corresponding wafer cassette CR.

[Film Thickness Measuring System]

Figure 2:
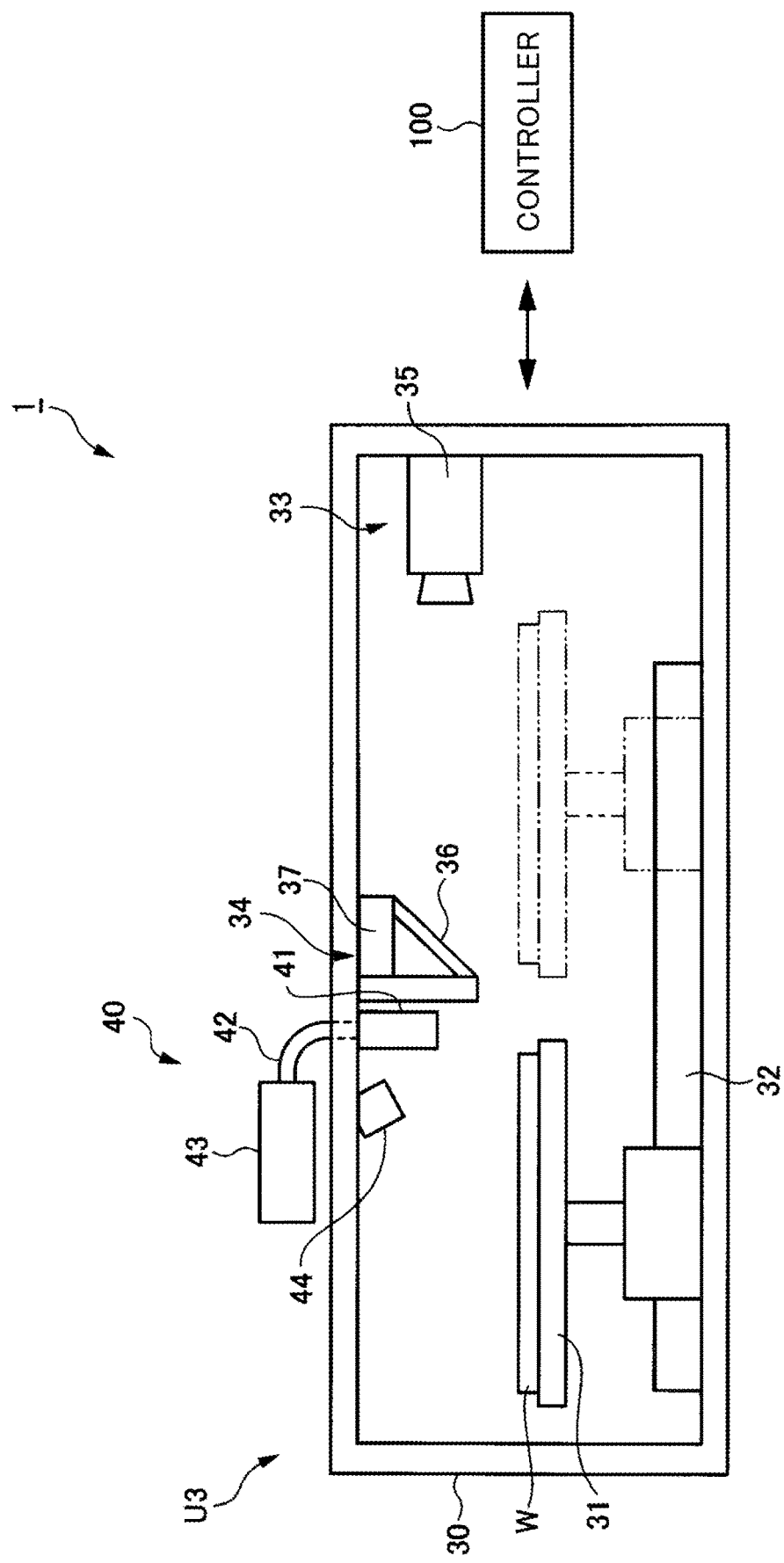
FIG. 2 is a schematic diagram illustrating an example of a film thickness measuring unit.

Next, a film thickness measuring system according to the present embodiment will be described. FIG. 2 is a schematic diagram illustrating an example of a film thickness measuring system 1. The film thickness measuring system 1 includes a controller 100 and the film thickness measuring unit U3.

[Thickness Measuring Unit]

The film thickness measuring unit U3 acquires information pertaining to the surface of a film formed on a substrate to be processed, such as a semiconductor wafer W, and information pertaining to the thickness of the film formed on the substrate.

As illustrated in FIG. 2, the film thickness measuring unit U3 includes a housing 30, a holder 31, an actuator 32, an imaging device 33, a light emitting/reflecting unit 34, and a spectroscopic measurement device 40. The holder 31 holds the wafer W horizontally. The actuator 32 employs, for example, an electric motor as a power source, to move the holder 31 along a horizontal linear path. The actuator 32 may also rotate the holder 31 in a horizontal plane. The imaging device 33 includes a camera 35, such as a CCD camera. Within the film thickness measuring unit U3, the camera 35 is disposed at one end of the moving direction of the holder 31, and is directed to the other end of the moving direction. The light emitting/reflecting unit 34 emits light to a range of imaging, and directs light reflected from the range of imaging toward the camera 35. For example, the light emitting/reflecting unit 34 includes a half-silvered mirror 36 and a light source 37. The half-silvered mirror 36 is provided at a position higher than the holder 31, and is disposed at the intermediate portion of the moving range of the actuator 32, to reflect light from below toward the camera 35. The light source 37 is provided over the half-silvered mirror 36 to emit light downward through the half-silvered mirror 36.

The spectroscopic measurement device 40 has a function to acquire spectra of light incident from the wafer W by separating the light incident from the wafer W. The spectroscopic measurement device 40 includes an incident portion 41 that receives light from the wafer W, a waveguide portion 42 that guides the light incident on the incident portion 41, a spectroscope 43 that separates the light guided by the waveguide portion 42 and that acquires the spectra of the light, and a light source 44. The incident portion 41 is configured to be capable of receiving light from a central portion of the wafer W when the wafer W held by the holder 31 moves in accordance with the actuator 32. That is, the incident portion 41 is provided at a position corresponding to the path of movement of the center of the holder 31 that is moved by the drive of the actuator 32. Then, the incident portion 41 is mounted such that the incident portion 41 moves relative to the surface of the wafer W along the radial direction of the wafer W when the wafer W is moved by the movement of the holder 31. Thus, the spectroscopic measurement device 40 can acquire spectra of light received from multiple points on the wafer W along the radial direction of the wafer W. Note that the multiple points on the wafer W along the radial direction of the wafer W include the center of the wafer W. Also, as the actuator 32 rotates the holder 31, the spectroscopic measurement device 40 can acquire spectra of light received from multiple concentric points on the wafer W. The waveguide portion 42 is formed of, for example, an optical fiber. The spectroscope 43 separates light incident on the spectroscope 43, and acquires spectra of the light containing intensity information of wavelengths of respective separated light. The light source 44 emits light downward. Thus, light reflected by the wafer W enters the spectroscope 43 through the incident portion 41 and the waveguide portion 42.

The wavelength range of the spectra acquired by the spectroscope 43 may be, for example, the wavelength range of visible light (380 nm to 780 nm). Therefore, by using a light source that emits visible light as the light source 44 and by separating light emitted from the light source 44 and reflected by the surface of the wafer W using the spectroscope 43, spectral data corresponding to the wavelength range of visible light can be obtained. The wavelength range of the spectra acquired by the spectroscope 43 is not limited to the wavelength range of visible light. For example, the wavelength range of the spectra acquired by the spectroscope 43 may include the wavelength range of infrared light or ultraviolet light. Depending on the wavelength range of spectral data to be acquired, a suitable spectroscope 43 and a suitable light source 44 may be selected.

The film thickness measuring unit U3 operates as follows to acquire image data of the surface of the wafer W. First, the actuator 32 moves the holder 31. This allows the wafer W to pass under the half-silvered mirror 36. While the wafer W passes under the half-silvered mirror 36, light reflected by the surface of the wafer W is sequentially transmitted to the camera 35. The camera 35 images the reflected light from the surface of the wafer W to acquire image data of the surface of the wafer W. If the thickness of a film formed on the surface of the wafer W varies, image data of the surface of the wafer W captured by the camera 35 changes. For example, the color of the surface of the wafer W changes in accordance with the thickness of the film. That is, acquiring image data with respect to the surface of the wafer W is equivalent to acquiring information on the thickness of the film formed on the surface of the wafer W. This point will be discussed below.

The image data acquired by the camera 35 is transmitted to the controller 100. Based on the image data, the controller 100 can estimate the thickness of the film on the surface of the wafer W, and the estimated thickness is retained as an inspection result in the controller 100.

In addition, the spectroscopic measurement device 40 performs spectroscopic measurement of light reflected at the surface of the wafer W. When the actuator 32 moves the holder 31, the wafer W passes under the incident portion 41. As the wafer W is being passed under the incident portion 41, light reflected from multiple points of the surface of the wafer W enters the incident portion 41, and enters the spectroscope 43 through the waveguide portion 42. The light incident on the spectroscope 43 is separated by the spectroscope 43, to acquire spectral data. If the thickness of a film formed on the surface of the wafer W varies, for example, the spectra changes in accordance with the thickness of the film. That is, acquiring spectral data with respect to the surface of the wafer W is equivalent to acquiring information on the thickness of the film formed on the surface of the wafer W. This point will be discussed below.

The spectral data acquired by the spectroscope 43 is transmitted to the controller 100. The controller 100 can estimate the thickness of the film on the surface of the wafer W based on the spectral data, and the result of the estimation is retained as an inspection result in the controller 100.

[Controller]

Figure 3:
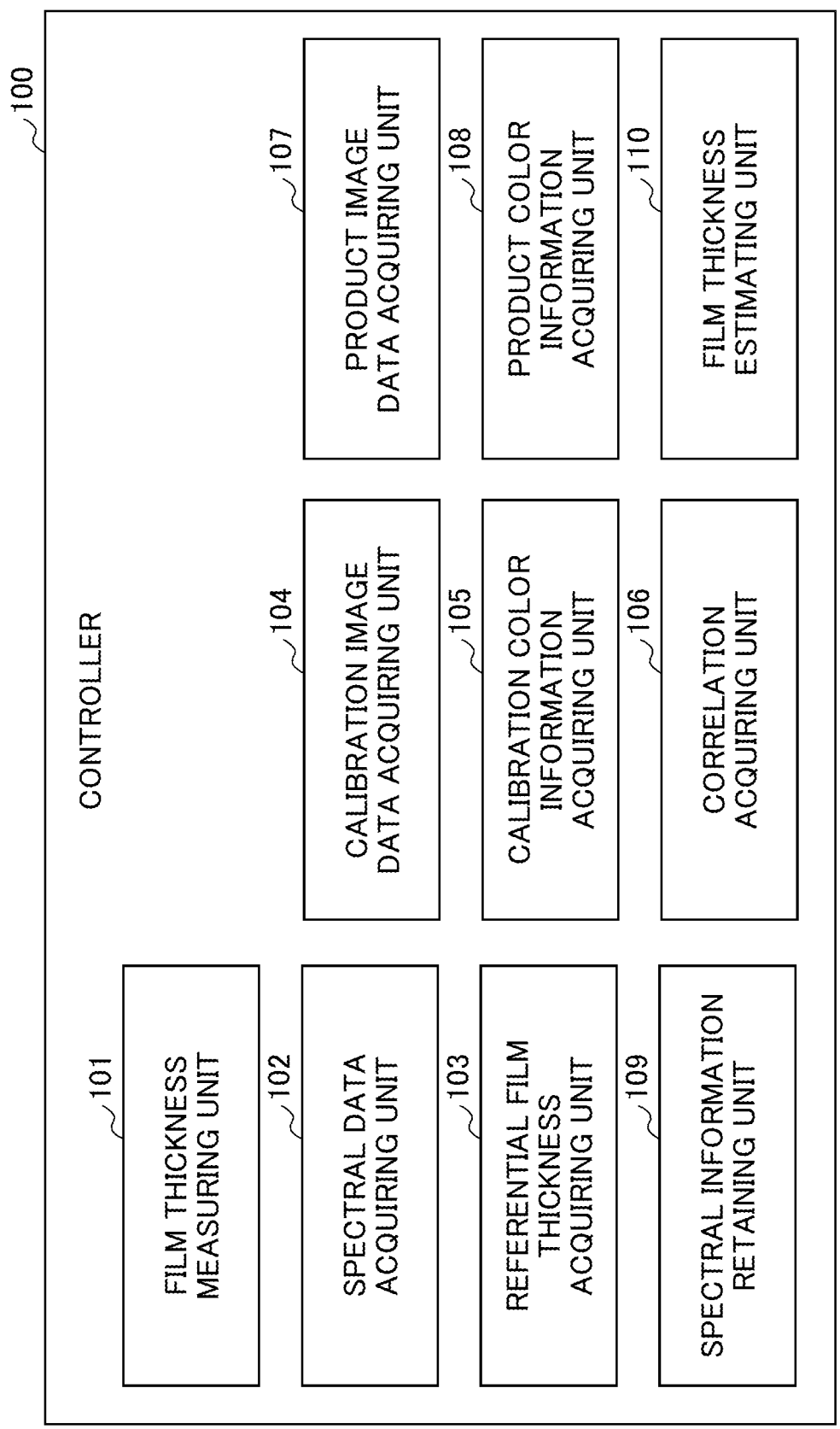
FIG. 3 is a block diagram illustrating an example of the functional configuration of a controller.

An example of the controller 100 will be described in detail. FIG. 3 is a block diagram illustrating an example of the functional configuration of the controller 100. The controller 100 controls each element included in the film thickness measuring unit U3. The controller 100 may be provided independently of the system controller of the substrate processing system 20. Alternatively, the controller 100 may be provided in communication with or integration with the system controller of the substrate processing system 20.

As illustrated in FIG. 3, the controller 100 includes the following functional modules of a film thickness measuring unit 101; a spectral data acquiring unit 102, a reference film thickness acquiring unit 103, a calibration image data acquiring unit 104, a calibration color information acquiring unit 105, a correlation acquiring unit 106, a product image data acquiring unit 107, a product color information acquiring unit 108, a spectral information retaining unit 109, and a film thickness estimating unit 110.

The film thickness measuring unit 101 controls operations of the film thickness measuring unit U3, regarding measurement of the film thickness of a wafer for product (may also be referred to as a "product wafer"). In the film thickness measurement performed by the film thickness measuring unit U3, image data and spectral data are acquired.

The spectral data acquiring unit 102 acquires spectral data pertaining to the surface of a reference wafer from the spectroscope 43 of the film thickness measuring unit U3, and retains the spectral data. The spectral data retained in the spectral data acquiring unit 102 is used to estimate the thickness of the film formed on the reference wafer.

The reference film thickness acquiring unit 103 calculates the thickness of the film formed on the reference wafer, based on the spectral data retained in the spectral data acquiring unit 102. Details of a procedure regarding the calculation of the film thickness are described below. The reference film thickness acquiring unit 103 is an example of a first film thickness acquiring unit.

The calibration image data acquiring unit 104 acquires image data of the surface of a wafer for calibration (may also be referred to as a "calibration wafer") captured by the imaging device 33 of the film thickness measuring unit U3, and retains the image data. The image data retained in the calibration image data acquiring unit 104 is used to acquire color information of the film formed on the calibration wafer. The calibration image data acquiring unit 104 is an example of a first image data acquiring unit.

The calibration color information acquiring unit 105 acquires and retains color information included in the image data retained in the calibration image data acquiring unit 104. Details of a procedure for obtaining color information are described below. The calibration color information acquiring unit 105 is an example of a first color information acquiring unit.

The correlation acquiring unit 106 acquires and retains a correlation between the thickness of a film to be measured and the color information. Details of a procedure for obtaining the correlation are described below.

The product image data acquiring unit 107 acquires, from the imaging device 33 of the film thickness measuring unit U3, image data of the surface of the product wafer, which is captured by the imaging device 33, and retains the image data. The image data retained in the product image data acquiring unit 107 is used to acquire color information of the film formed on the product wafer. The product image data acquiring unit 107 is an example of a second image data acquiring unit.

The product color information acquiring unit 108 acquires and retains color information included in the image data retained in the product image data acquiring unit 107. Details of the procedure for obtaining color information are described later. The product color information acquiring unit 108 is an example of a second color information acquiring unit.

The spectral information retaining unit 109 has a function to retain spectral information used in calculating a film thickness from the spectral data. Spectral data acquired by the film thickness measuring unit U3 varies depending on the type and thickness of a film formed on the surface of the wafer W. Therefore, the spectral information retaining unit 109 retains information pertaining to the relationship between film thickness and spectra.

The film thickness estimating unit 110 estimates the thickness of the film formed on the product wafer based on the color information retained in the product color information acquiring unit 108 and the correlation retained in the correlation acquiring unit 106. Details of a procedure for estimating film thickness are described below. The film thickness estimating unit 110 is an example of an estimating unit.

Figure 4:
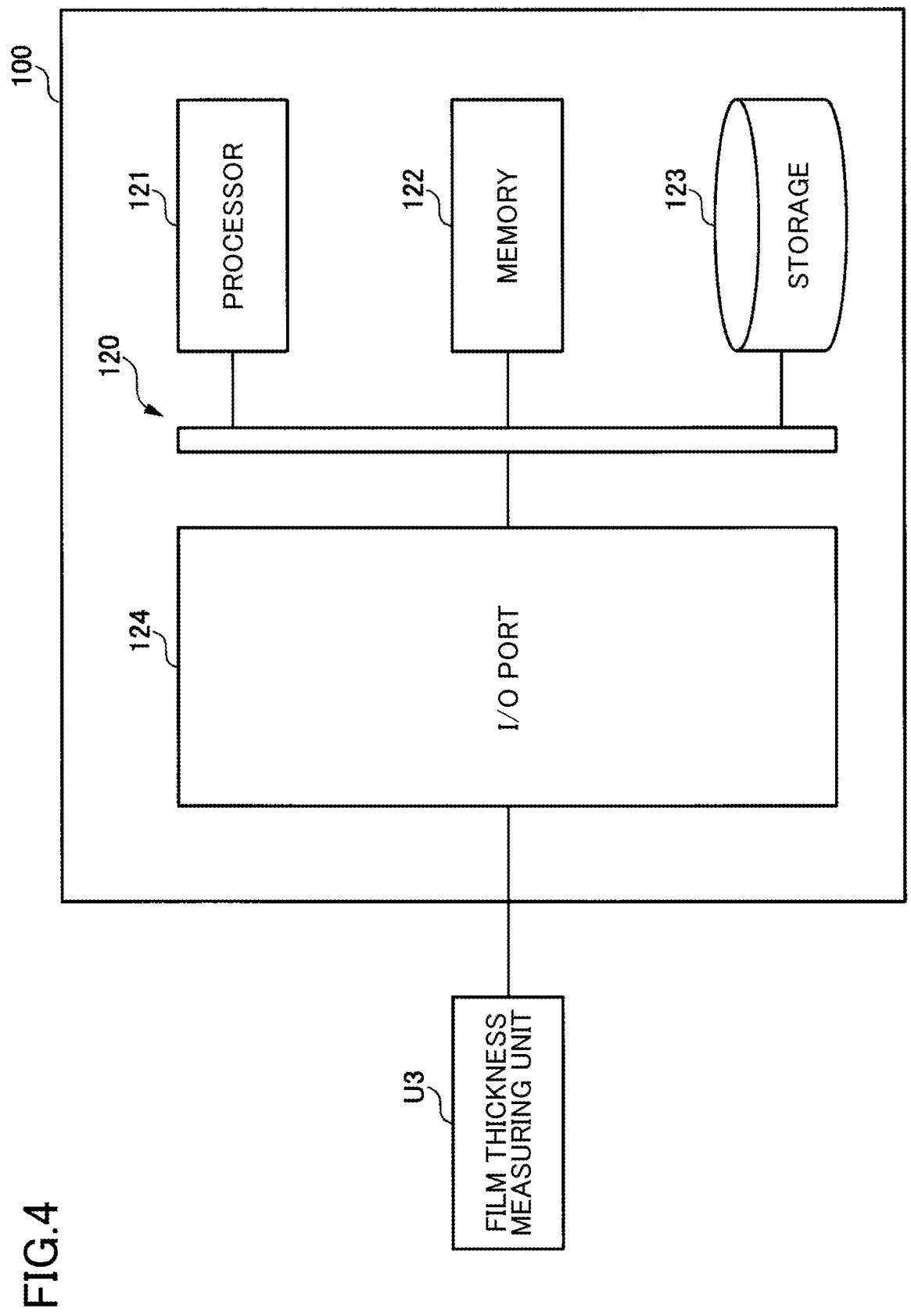
FIG. 4 is a block diagram illustrating an example of the hardware configuration of the controller.

The controller 100 is configured by one or more control computers. FIG. 4 is a block diagram illustrating an example of the hardware configuration of the controller 100. For example, the controller 100 includes circuitry 120 illustrated in FIG. 4. The circuitry 120 includes one or more processors 121, a memory 122, a storage 123, and an input/output (I/O) port 124. The storage 123 includes a non-transitory computer-readable recording medium, such as a hard disk drive. The recording medium stores a program that causes the controller 100 to execute processes described below. The recording medium may be a non-volatile semiconductor memory, a magnetic disk, or a removable medium such as an optical disk. The memory 122 temporarily stores the program loaded from the recording medium of the storage 123 and results of calculation generated by the processor 121. The processor 121 configures each of the above-described functional modules by executing the program in cooperation with the memory 122. The I/O port 124 performs input and output of electrical signals to and from components to be controlled, in accordance with instructions from the processor 121.

The hardware configuration of the controller 100 is not necessarily limited to a configuration in which each of the functional modules is implemented by a program. For example, each of the functional modules of the controller 100 may be configured by a dedicated logic circuit or an application specific integrated circuit (ASIC).

Part of the functions illustrated in FIG. 3 may be provided in a device different from the controller 100 that controls the film thickness measuring unit U3. In a case in which part of the functions are provided in an external device different from the controller 100, the external device and the controller 100 cooperate to perform the functions described in the following embodiment. In such a case, the external device having the function corresponding to the controller 100 described in the present embodiment and the remainder of the film thickness measuring system 1 described in the present embodiment may function in the same manner as an integral film thickness measuring system.

[Method of Measuring Film Thickness]

Next, a method of measuring the film thickness (may also be referred to as a film thickness measuring method) by the controller 100 will be described. The film thickness measuring method is a method pertaining to the measurement of the thickness of a film deposited on a wafer that is performed by the film thickness measuring unit U3. The film thickness measuring unit U3 measures the thickness of the film deposited on the wafer W. As described above, the film thickness measuring unit U3 includes, for example, the imaging device 33 and the spectroscopic measurement device 40. Therefore, image data of the surface of a wafer N can be captured by the imaging device 33, and spectral data of light reflected by the surface of the wafer W can be acquired by the spectroscopic measurement device 40. The controller 100 measures (estimates) film thickness based on the acquired data. In the following description, a case in which the thickness of a silicon nitride film is measured will be described.

Figure 5:
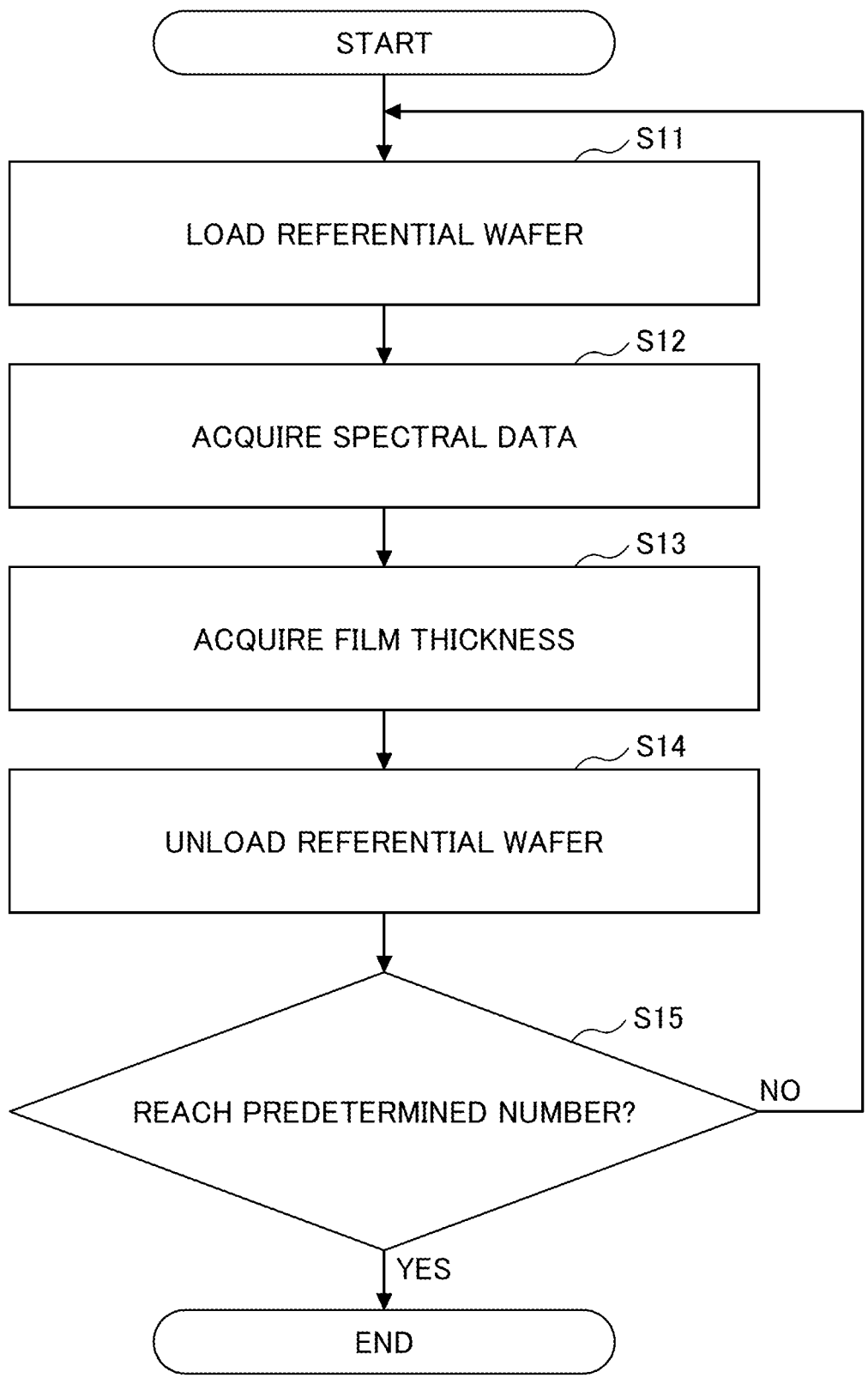
FIG. 5 is a flowchart illustrating an example of a process (acquisition of reference data) performed by the controller.
Figure 6:
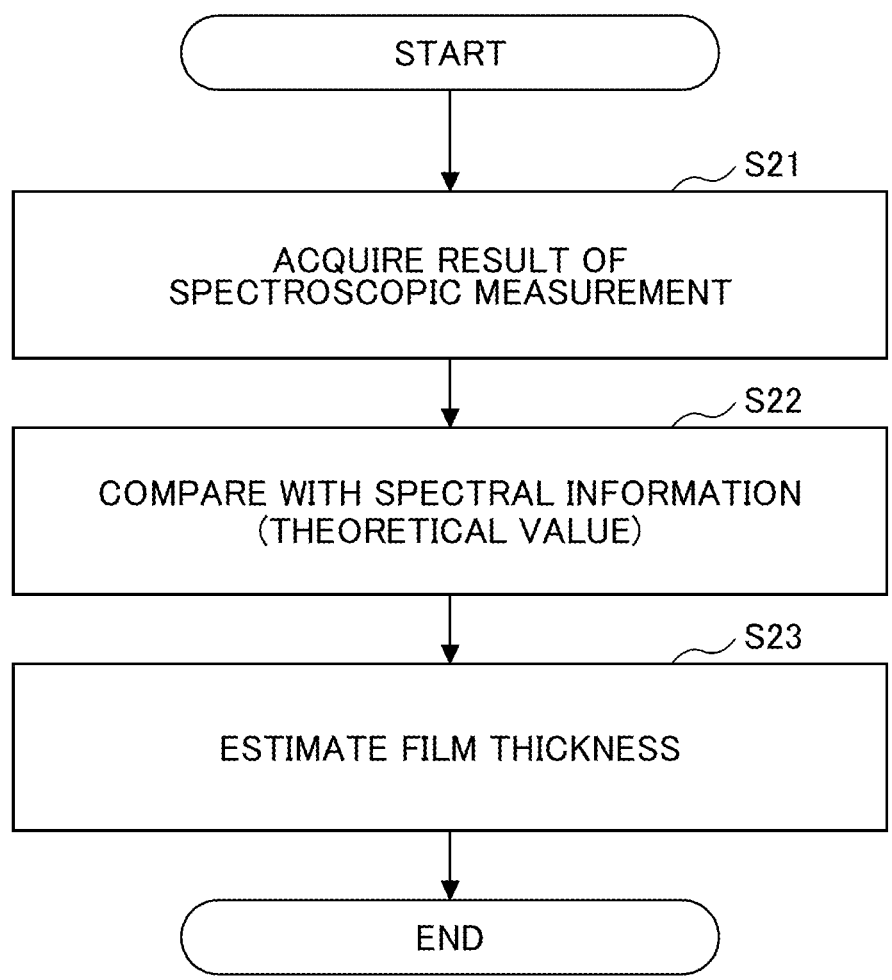
FIG. 6 is a flowchart illustrating an example of a process (estimation of film thickness from spectral data) performed by the controller.
Figure 7:
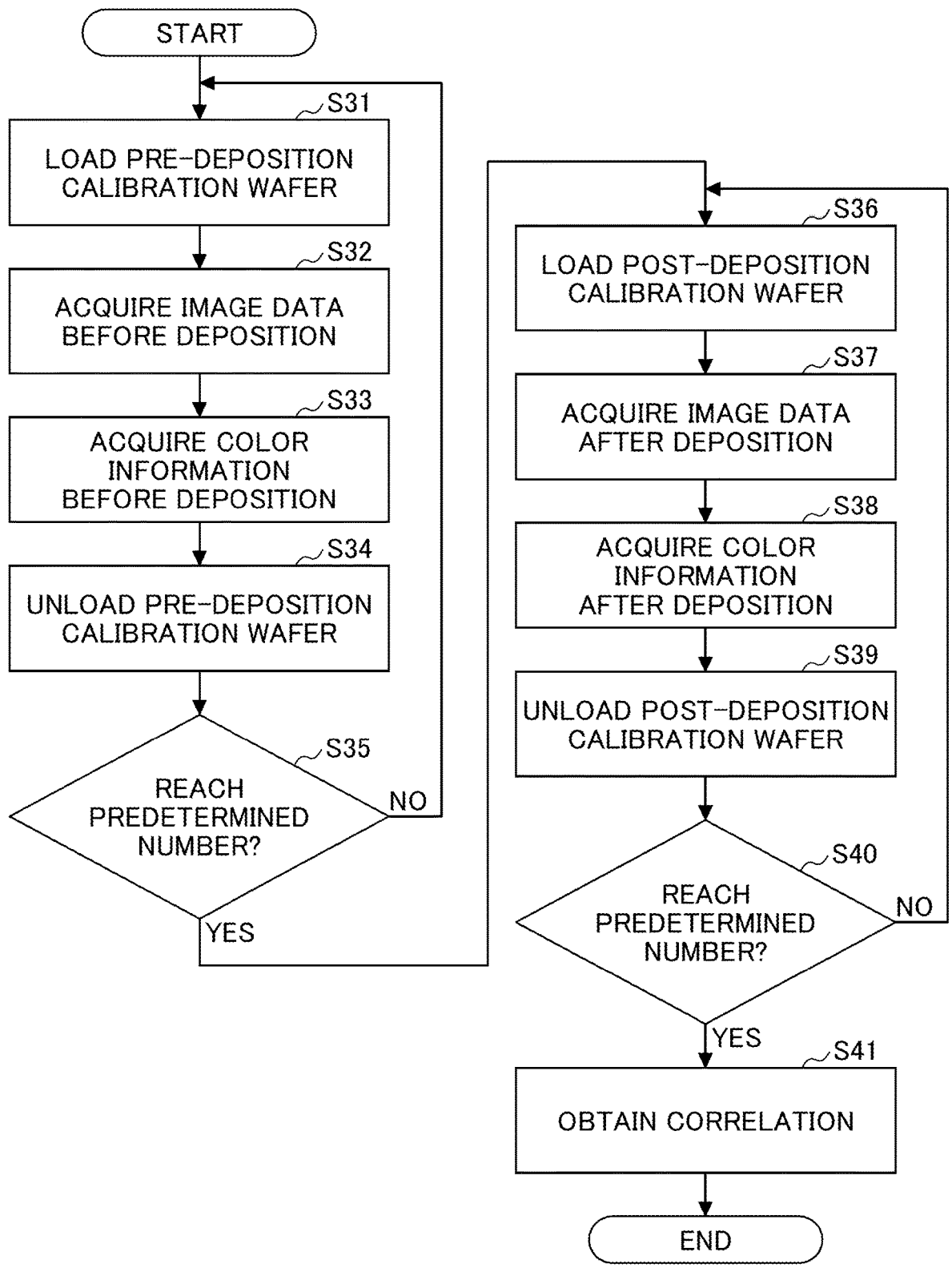
FIG. 7 is a flow diagram illustrating an example of a process (acquisition of calibration data) performed by the controller.
Figure 8:
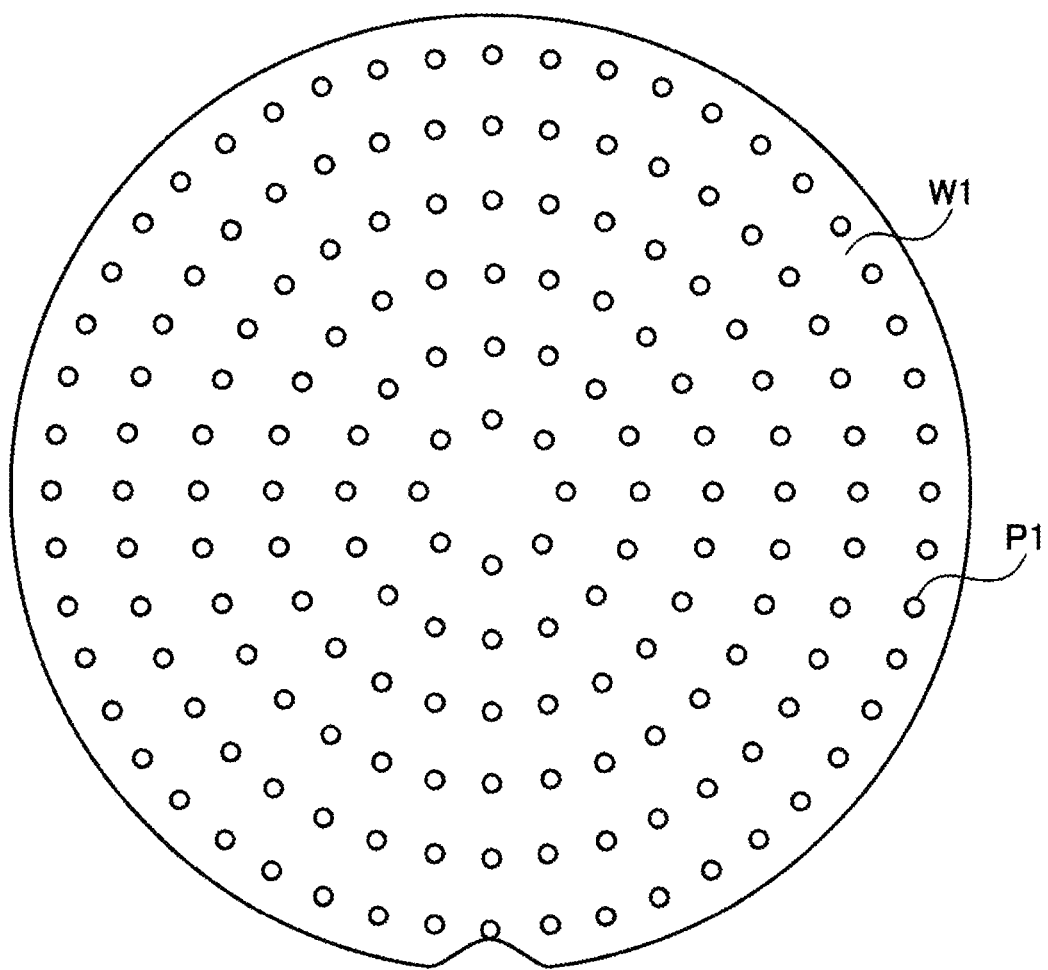
FIG. 8 is a diagram illustrating an example of locations on a reference wafer from which reflected light is acquired and spectral data of the reflected light is acquired.
Figure 9:
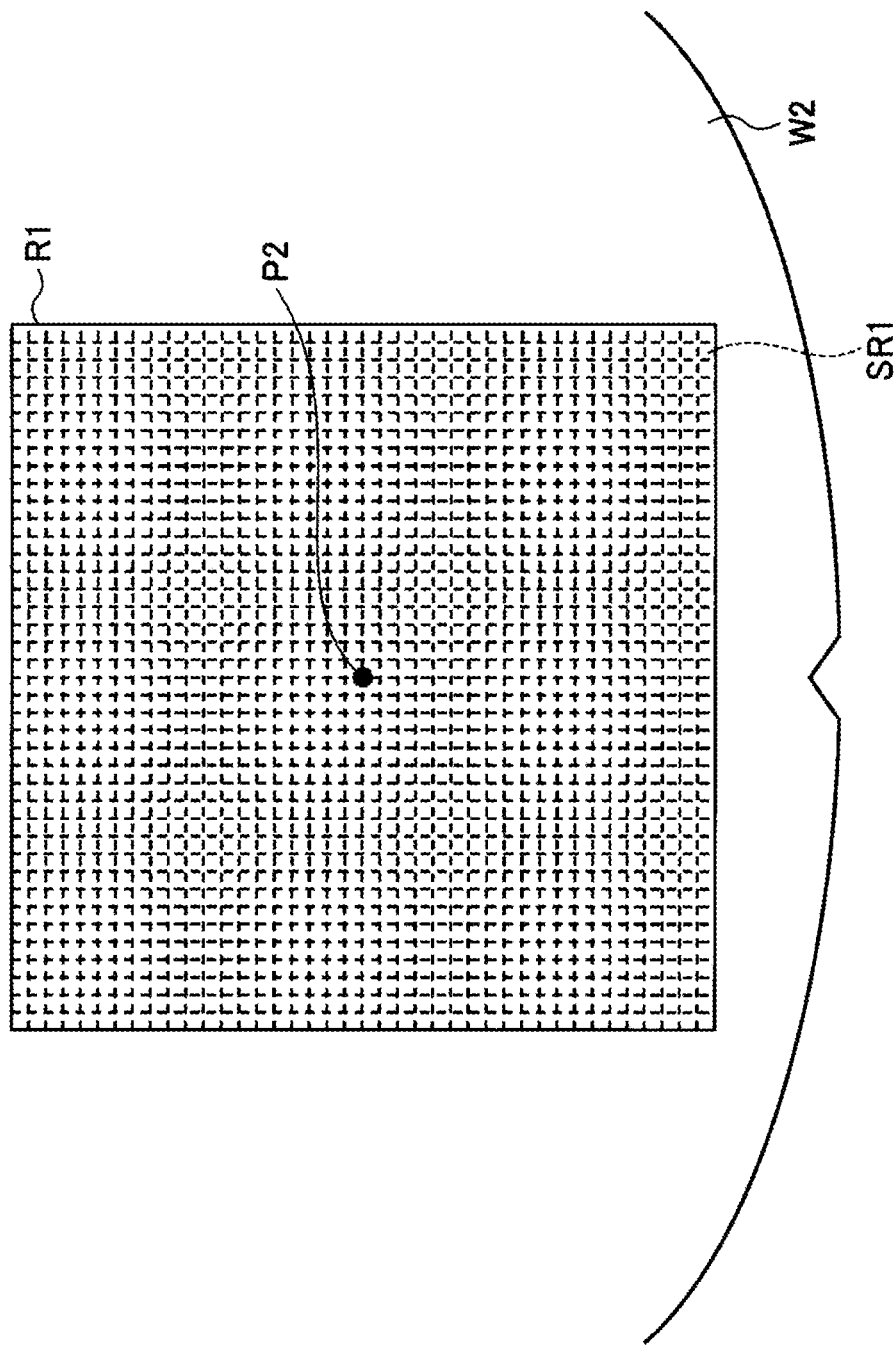
FIG. 9 is a diagram illustrating an example of a region of a calibration wafer whose color information is acquired.

Before measuring the thickness of a silicon nitride film, the controller 100 acquires reference data and calibration data to be used for the measurement. FIG. 5 is a flowchart illustrating an example of a process of acquiring reference data performed by the controller 100. FIG. 6 is a flowchart illustrating an example of a process of estimating film thickness from spectral data, which is performed by the controller 100. FIG. 7 is a flowchart illustrating an example of a process of acquiring calibration data performed by the controller 100. FIG. 8 is a diagram illustrating an example of locations on the reference wafer, from which reflected light is collected and the spectral data of the reflected light is acquired. FIG. 9 is a diagram illustrating an example of a region of the calibration wafer, whose color information is acquired.

[Acquisition of Reference Data]

When acquiring the reference data, N (N is an integer equal to or greater than 2) reference wafers W1 (see FIG. 8), on which films to be measured are formed, are prepared in advance. As mentioned above, the film to be measured is a silicon nitride film. The reference wafer W1 is a wafer on which a silicon nitride film is entirely formed on a bare wafer on which a pattern is not formed. Thicknesses of the silicon nitride films formed on the N respective reference wafers W1 differ from each other. For example, in a case in which five reference wafers W1 are prepared, the thicknesses of the silicon nitride films formed on the respective reference wafers W1 are approximately 64 nm, 66 nm, 70 nm, 72 nm, and 74 nm, respectively. However, the film thickness of each of the silicon nitride films on the reference wafers W1 is not strictly equal to the above values. The reference wafer W1 is an example of a first substrate, and the silicon nitride film formed on the reference wafer W1 is an example of a first film.

As illustrated in FIG. 5, the film thickness measuring unit 101 of the controller 100 first performs step S11. In step S11, one reference wafer W1 is loaded into the film thickness measuring unit U3. The reference wafer W1 is retained by the holder 31.

Next, the spectral data acquiring unit 102 of the controller 100 executes step S12. In step S12, with respect to multiple predetermined measurement locations on the surface of the reference wafer W1, spectroscopic measurement is performed using the spectroscopic measurement device 40. As described above, the incident portion 41 of the spectroscopic measurement device 40 is provided over a path through which the center of a wafer W (i.e., reference wafer W1) held by the holder 31 passes as the holder 31 moves. Thus, the spectroscopic measurement device 40 can acquire spectra of light reflected from multiple points on the diameter of the reference wafer W1 including the center. Further, as the actuator 32 rotates the holder 31, the spectroscopic measurement device 40 can acquire spectra of light reflected from multiple concentric points on the reference wafer W1. Accordingly, as illustrated in FIG. 8, reflected light from multiple first positions P1, which correspond to intersections of multiple lines passing through the center of the reference wafer W1 and multiple concentric circles on the reference wafer W1, enters the incident portion 41. The spectroscope 43 separates the light incident on the incident portion 41, and thereby acquires P number of spectral data (e.g., 49 pieces of spectral data) corresponding to the respective first positions P1 illustrated in FIG. 8. Thus, by using the spectroscope 43, spectral data of light reflected from the multiple first positions P1 on the surface of the reference wafer W1 is acquired. The positions of the first positions P1 and the number of the first positions P1 may be appropriately changed in accordance with measurement interval performed by the spectroscope 43 and moving speed of the reference wafer W1 by the holder 31. The spectral data acquired by the spectroscope 43 is retained in the spectral data acquiring unit 102 of the controller 100. When performing spectroscopic measurement, by specifying the center of the holder 31 and the center of the reference wafer W1 held by the holder 31 using image information, and by adjusting the difference between these centers, the spectroscopic measurement device 40 can be correctly aligned to each of the first positions P1. The same applies to spectroscopic measurements for the calibration wafer W2 and the product wafer W3 described below.

Next, the reference film thickness acquiring unit 103 of the controller 100 executes step S13. In step S13, the thickness of the silicon nitride film at each of the first positions P1 where the spectroscopic measurement has been performed is acquired (estimated) from the spectral data. Acquisition of film thickness using spectral data utilizes a change in reflectance in accordance with the thickness of a film on the surface. When light is irradiated on a wafer having one or more films formed on the surface, light is reflected at the surface of the uppermost film or at the interface between the uppermost film and its underlying layer (i.e., the underlying film or the wafer). That is, the reflected light includes two light components that are different in phase (i.e., light reflected at the surface of the uppermost film, and light reflected at the interface between the uppermost film and its underlying layer). In addition, as the thickness of the film on the surface increases, the phase difference between the two light components increases. Accordingly, as the thickness of the film changes, a degree of interference between the light reflected at the surface of the film and the light reflected at the interface with the lower layer changes. That is, spectra of the reflected light changes. The change in spectra in accordance with the thickness of the film can be calculated theoretically. Accordingly, in the controller 100, information regarding the relationship between the spectra and the thickness of the film formed on the surface is stored in advance. Then, the spectra of the reflected light that is obtained by irradiating the actual reference wafer W1 with light is compared with the information retained in advance. This allows the thickness of the film on the surface of the reference wafer W1 to be estimated. The information pertaining to the relationship between the film thickness and the spectra used in estimating the film thickness is retained in the spectral information retaining unit 109 of the controller 100.

Specifically, a method of calculating the thickness of a film from spectral data is as illustrated in FIG. 6. First, after a result of the spectroscopic measurement (i.e., spectral data) is acquired (step S21), the spectral data is compared with the information retained in the spectral information retaining unit 109, that is, information regarding the spectra corresponding to a theoretical thickness of a film (step S22). As a result, in step S23, for each spectral data, the thickness of the film at a region in which the corresponding spectral data was obtained can be estimated. This enables estimation of the film thickness corresponding to each spectral data, that is, the film thickness at each of the first positions P1 on the surface of the reference wafer W1.

Next, the film thickness measuring unit 101 of the controller 100 executes step S14. In step S14, the reference wafer W1 is unloaded from the film thickness measuring unit U3.

The controller 100 performs the process of steps S11 to S14 for the predetermined number (N) of reference wafers W1 that have been prepared in advance (NO in step S15).

When the process is completed for all of the predetermined number (N) of reference wafers W1 having been prepared in advance (YES in step S15), the film thickness measuring unit 101 of the controller 100 completes the process of acquiring the reference data.

As described above, for each of the N number of reference wafers W1, the thickness of the silicon nitride film at each of the first positions P1 is acquired and retained, as the reference data, in the reference film thickness acquiring unit 103 of the controller 100.

[Acquisition of Calibration Data]

Regarding acquisition of calibration data, N number of calibration wafers W2 (see FIG. 9), on each of which a pattern similar to a pattern of the product wafer is formed, are prepared in advance. The calibration wafer W2 is a wafer imitating the product wafer. In the initial state, a film to be measured, which is a silicon nitride film in the present embodiment, has not been formed on the calibration wafer W2. Hereinafter, a calibration wafer W2 on which a film to be measured has not been formed is referred to as a pre-deposition calibration wafer W2. The calibration wafer W2 is an example of a second substrate.

As illustrated in FIG. 7, the film thickness measuring unit 101 of the controller 100 first performs step S31. In step S31, one pre-deposition calibration wafer W2 is loaded into the film thickness measuring unit U3. The pre-deposition calibration wafer W2 is held by the holder 31.

Next, the calibration image data acquiring unit 104 of the controller 100 executes step S32. In step S32, an image of the surface of the pre-deposition calibration wafer W2 is captured using the imaging device 33. Specifically, the image of the surface of the pre-deposition calibration wafer W2 is captured by the imaging device 33 while the holder 31 is moved in a predetermined direction by the actuator 32. Accordingly, image data before deposition pertaining to the surface of the pre-deposition calibration wafer W2 is acquired by the imaging device 33. The image data before deposition is retained in the calibration image data acquiring unit 104 of the controller 100.

Next, the calibration color information acquiring unit 105 of the controller 100 executes step S33. In the following description, positions on the calibration wafer W2 that correspond to the respective first positions P1 on the reference wafer W1 are referred to as "second positions P2". In step S33, as illustrated in FIG. 9, for each of the second positions P2 on the calibration wafer W2, color information before deposition of multiple first sub-regions SR1 within a first region R1 including the corresponding second position P2, which is included in the image data before deposition, is acquired. The first region R1 is a predetermined region provided for each of the second positions P2. For example, the second position P2 is located at the center of the first region R1. The number of the first regions R1 is equal to the number of the first positions P1 or the number of the second positions P2, e.g., 49. The multiple first sub-regions SR1 are predetermined sub-regions provided for each of the first regions R1. For example, total 1600 of the first sub-regions SR1 are provided in each of the first regions R1. In each of the first regions R1, 40 pieces of the first sub-regions SR1 are arranged in a vertical direction and 40 pieces of the first sub-regions SR1 are arranged in a horizontal direction. The first sub-regions SR1 correspond to, for example, respective pixels of an image sensor (e.g., CCD sensor) of the imaging device 33. That is, color information (e.g., luminance) of each of the first sub-regions SR1 is captured by a corresponding pixel of the imaging device 33. The size of each of the first sub-regions SR1 is, for example, 150 μm×150 μm. As the color information before deposition, the calibration color information acquiring unit 105 acquires, for example, luminance of R (red), luminance of G (green), and luminance of B (blue) from the image data before deposition. The color information before deposition is retained in the calibration color information acquiring unit 105 of the controller 100.

Next, the film thickness measuring unit 101 of the controller 100 executes step S34. In step S34, the pre-deposition calibration wafer W2 is unloaded from the film thickness measuring unit U3. On the pre-deposition calibration wafer W2 having been unloaded from the film thickness measuring unit U3, a film to be measured having the same thickness as the film to be measured formed on the corresponding reference wafer W1 is formed. Hereinafter, the calibration wafer W2 on which the film to be measured is formed is referred to as a post-deposition calibration wafer W2. The thickness of the silicon nitride film formed on each of the post-deposition calibration wafers W2 is equal to the thickness of the silicon nitride film formed on a corresponding reference wafer W1. For example, the thicknesses of the silicon nitride films on the five post-deposition calibration wafers W2 are approximately 64 nm, 66 nm, 70 nm, 72 nm, and 74 nm, respectively. However, the film thicknesses of the silicon nitride films on the post-deposition calibration wafers W2 are not strictly equal to the above values. The silicon nitride film formed on the calibration wafer W2 is an example of a second film.

The controller 100 applies the process of steps S31 to S34 to the predetermined number (N) of pre-deposition calibration wafers W2 that have been prepared in advance (NO in step S35).

Then, after the process of steps S31 to S34 is applied to all of the predetermined number (N) of pre-deposition calibration wafers W2 having been prepared in advance (YES in step S35), the film thickness measuring unit 101 of the controller 100 executes step S36. In step S36, one post-deposition calibration wafer W2 is loaded into the film thickness measuring unit U3. The post-deposition calibration wafer W2 is held by the holder 31.

Next, the calibration image data acquiring unit 104 of the controller 100 executes step S37. In step S37, an image of the surface of the post-deposition calibration wafer W2 is captured using the imaging device 33. Specifically, the image of the surface of the post-deposition calibration wafer W2 is captured by the imaging device 33 while the holder 31 is moved in a predetermined direction by the actuator 32. Thus, image data after deposition pertaining to the surface of the post-deposition calibration wafer W2 is acquired by the imaging device 33. The image data after deposition is retained in the calibration image data acquiring unit 104 of the controller 100. The image data after deposition of the post-deposition calibration wafer W2 is an example of first image data.

Next, the calibration color information acquiring unit 105 of the controller 100 executes step S38. In step S38, similar to the acquisition of the color information before deposition of the pre-deposition calibration wafer W2, for each of the second positions P2 on the post-deposition calibration wafer W2, color information after deposition of the multiple sub-regions SR1 in the first region R1 including the corresponding second position P2, which is included in the image data after deposition, is acquired. As the color information after deposition, the calibration color information acquiring unit 105 acquires, for example, luminance of R (red), luminance of G (green), and luminance of B (blue) from the image data after deposition. The color information after deposition is retained in the calibration color information acquiring unit 105 of the controller 100. The color information after deposition of the post-deposition calibration wafer W2 is an example of first color information.

Next, the film thickness measuring unit 101 of the controller 100 executes step S39. In step S39, the post-deposition calibration wafer W2 is unloaded from the film thickness measuring unit U3.

The controller 100 applies the process of steps S36 to S39 to the predetermined number (N) of the post-deposition calibration wafers W2 that have been prepared in advance (NO in step S40).

Figure 10:
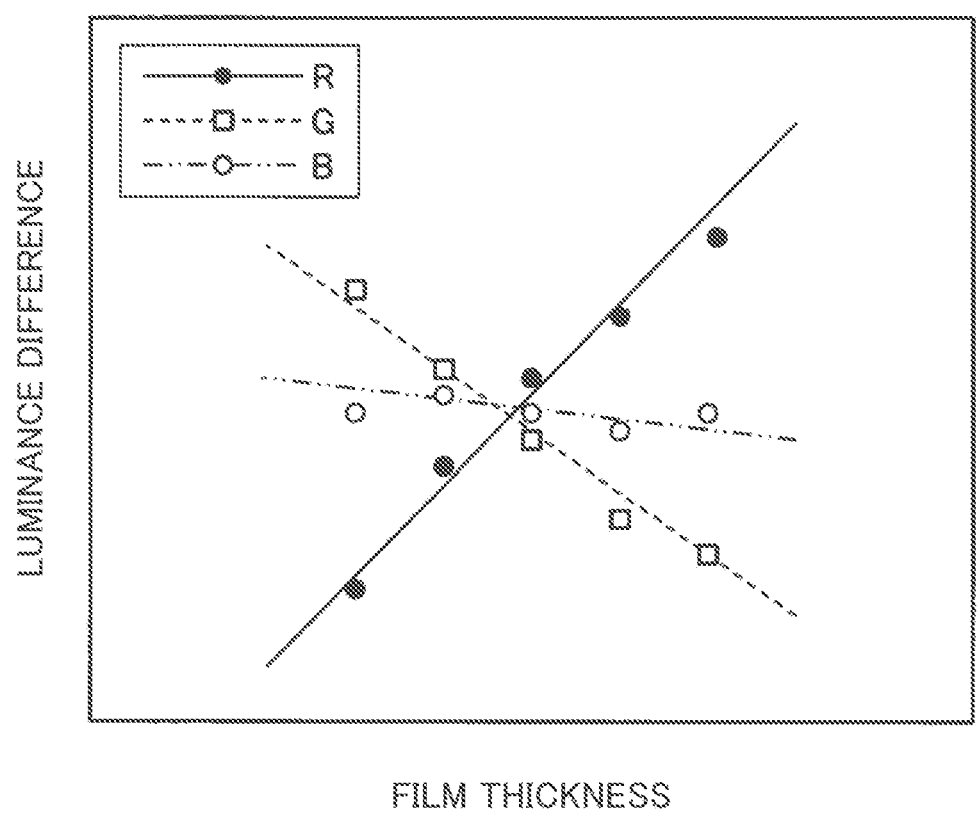
FIG. 10 is a diagram illustrating an example of the relationship between the film thickness and a luminance difference in a first sub-region.

After the process of steps S36 to S39 is applied to all of the predetermined number (N) of the post-deposition calibration wafers W2 prepared in advance (YES in step S40), the correlation acquiring unit 106 of the controller 100 executes step S41. In step S41, for each of the sub-regions SR1 within all of the multiple first region R1, a correlation between the film thickness of the silicon nitride film in the corresponding first region R1 and calibration color information of the corresponding first sub-region SR1 is calculated, and the calculated correlation is stored in the correlation acquiring unit 106. In calculating the correlation, as the film thickness of the silicon nitride film in the first region R1 of the post-deposition calibration wafers W2, the film thickness of the silicon nitride film at the corresponding first position P1 on the corresponding reference wafer W1 retained in the reference film thickness acquiring unit 103 is used. Further, the calibration color information is information indicating a difference between the color information before deposition and the color information after deposition in each of the first sub-regions SR1. Specifically, a set of a difference between a luminance value of R (red) acquired from the pre-deposition calibration wafer W2 and a luminance value of R (red) acquired from the post-deposition calibration wafer W2, a difference between a luminance value of G (green) acquired from the pre-deposition calibration wafer W2 and a luminance value of G (green) acquired from the post-deposition calibration wafer W2, and a difference between a luminance value of B (blue) acquired from the pre-deposition calibration wafer W2 and a luminance value of B (blue) acquired from the post-deposition calibration wafer W2, is used as the difference between the color information before deposition and the color information after deposition (i.e., calibration color information). In the present embodiment, the difference between the luminance value acquired from the image data before deposition and the luminance value acquired from the image data after deposition (i.e., difference between the color information before deposition and the color information after deposition) may be referred to as a "luminance difference" or a "luminance difference value". FIG. 10 is a diagram illustrating an example of the relationship between the thickness of the film and the luminance difference in a first sub-region SR1. The relationship (correlation) illustrated in FIG. 10 can be acquired for each of the first sub-regions SR1.

For example, using multiple regression analysis, the correlation acquiring unit 106 calculates equations each representing the correlation between calibration color information of a corresponding first sub-region SR1 and the film thickness of the silicon nitride film on a first region R1 in which the corresponding first sub-region SR1 is located, based on the assumption that the correlation is expressed by the following Equation 1. Equation 1 is an example of the equation representing the correlation. In Equation 1, y is the film thickness of the silicon nitride film, $x_i$ (i is an integer ranging from 1 to 3) is a luminance difference value of the first sub-region SR1. For example, $x_1$, $x_2$, and $x_3$ are a luminance difference value of R (red), a luminance difference value of G (green), and a luminance difference value of B (blue), respectively. In addition, $\alpha$ is a constant, and $\beta_1$ is a multiple regression coefficient (may simply be referred to as the "coefficient" in the present embodiment). The correlations are calculated (obtained) for each of the first sub-regions SR1 in all of the first regions R1.

$$y=\alpha+\Sigma\beta_i x_i=\alpha+\beta_1 x_1+\beta_2 x_2+\beta_3 x_3 \quad \text{(Equation 1)}$$

An example of calculating (obtaining) a correlation between color information (calibration color information) and a film thickness (i.e., obtaining the constant $\alpha$ and the coefficients $\beta_i$) with respect to a certain sub-region of the calibration wafer will be described below. In the following, suppose a case of calculating (obtaining) a correlation between color information and a film thickness using 5 reference wafers W11, W12, W13, W14, and W15, and using 5 calibration wafers W21, W22, W23, W24, and W25. Note that definitions of terms used in the following description are the same as described above. That is, the certain sub-region of the calibration wafer is one of the sub-regions SR1 included in a first region R1 of the calibration wafer, and a second position P2 in the first region R1, which includes the certain sub-region, corresponds to a first position P1 on the reference wafer.

Suppose a case in which the thickness of the films on the first position of the reference wafers W11, W12, W13, W14, and W15 are T1, T2, T3, T4, and T5, respectively, and the thickness of the films on the first position of the reference wafers W11, W12, W13, W14, and W15 are substantially equal to the thicknesses of the films on the second position of the calibration wafers W21, W22, W23, W24, and W25, respectively. Further, suppose a case in which color information (luminance difference values) of the certain sub-region of the calibration wafers W21, W22, W23, W24, and W25 is as follows:

luminance difference value of R (red) of the calibration wafer W21 is Lr1
luminance difference value of G (green) of the calibration wafer W21 is Lg1
luminance difference value of B (blue) of the calibration wafer W21 is Lb1
luminance difference value of R (red) of the calibration wafer W22 is Lr2
luminance difference value of G (green) of the calibration wafer W22 is Lg2
luminance difference value of B (blue) of the calibration wafer W22 is Lb2
luminance difference value of R (red) of the calibration wafer W23 is Lr3
luminance difference value of G (green) of the calibration wafer W23 is Lg3
luminance difference value of B (blue) of the calibration wafer W23 is Lb3
luminance difference value of R (red) of the calibration wafer W24 is Lr4 luminance difference value of G (green) of the calibration wafer W24 is Lg4 luminance difference value of B (blue) of the calibration wafer W24 is Lb4 luminance difference value of R (red) of the calibration wafer W25 is Lr5 luminance difference value of G (green) of the calibration wafer W25 is Lg5 luminance difference value of B (blue) of the calibration wafer W25 is Lb5

In this case, by performing multiple regression analysis using the following 5 sets of data ((T1, Lr1, Lg1, Lb1), (T2, Lr2, Lg2, Lb2), (T3, Lr3, Lg3, Lb3), (T4, Lr4, Lg4, Lb4), and (T5, Lr5, Lg5, Lb5)), the constant α and the coefficients $\beta_i$ ($\beta_1$, $\beta_2$, $\beta_3$) with respect to the certain sub-region of the calibration wafer are obtained. The multiple regression analysis for obtaining the constant α and the coefficients $\beta_i$ is performed for each of the sub-regions SR1.

The example of calculating (obtaining) a correlation between color information (calibration color information) and a film thickness using multiple regression analysis has been described above. However, a method of obtaining (calculating) a correlation between color information and a film thickness is not limited to multiple regression analysis. A correlation between color information and a film thickness may be obtained by using other known methods, such as support vector machine (SVM), regression trees, nonlinear regression, Gaussian process regression (GPR), and regression analysis considering overfitting such as Ridge regression, Lasso regression, and PLS regression.

After obtaining (calculating) the correlations, the film thickness measuring unit 101 of the controller 100 terminates the process of acquiring the calibration data.

As described above, for each of the first sub-regions SR1 in all of the first regions R1, the correlation between the thickness of the silicon nitride film within the corresponding first region R1 and the calibration color information (luminance difference value) of the corresponding first sub-region SR1 is acquired and retained in the correlation acquiring unit 106 of the controller 100 as the calibration data. The correlation is not necessarily retained in the format of a mathematical expression like Equation 1. In a case in which the correlation is expressed by the above-described Equation 1, a set of the constant α and the coefficients $\beta_i$ ($\beta_1$, $\beta_2$, $\beta_3$) in Equation 1 may be retained in the correlation acquiring unit 106 for each of the first sub-regions SR1.

[Film Thickness Measurement for Product Wafers]

Figure 11:
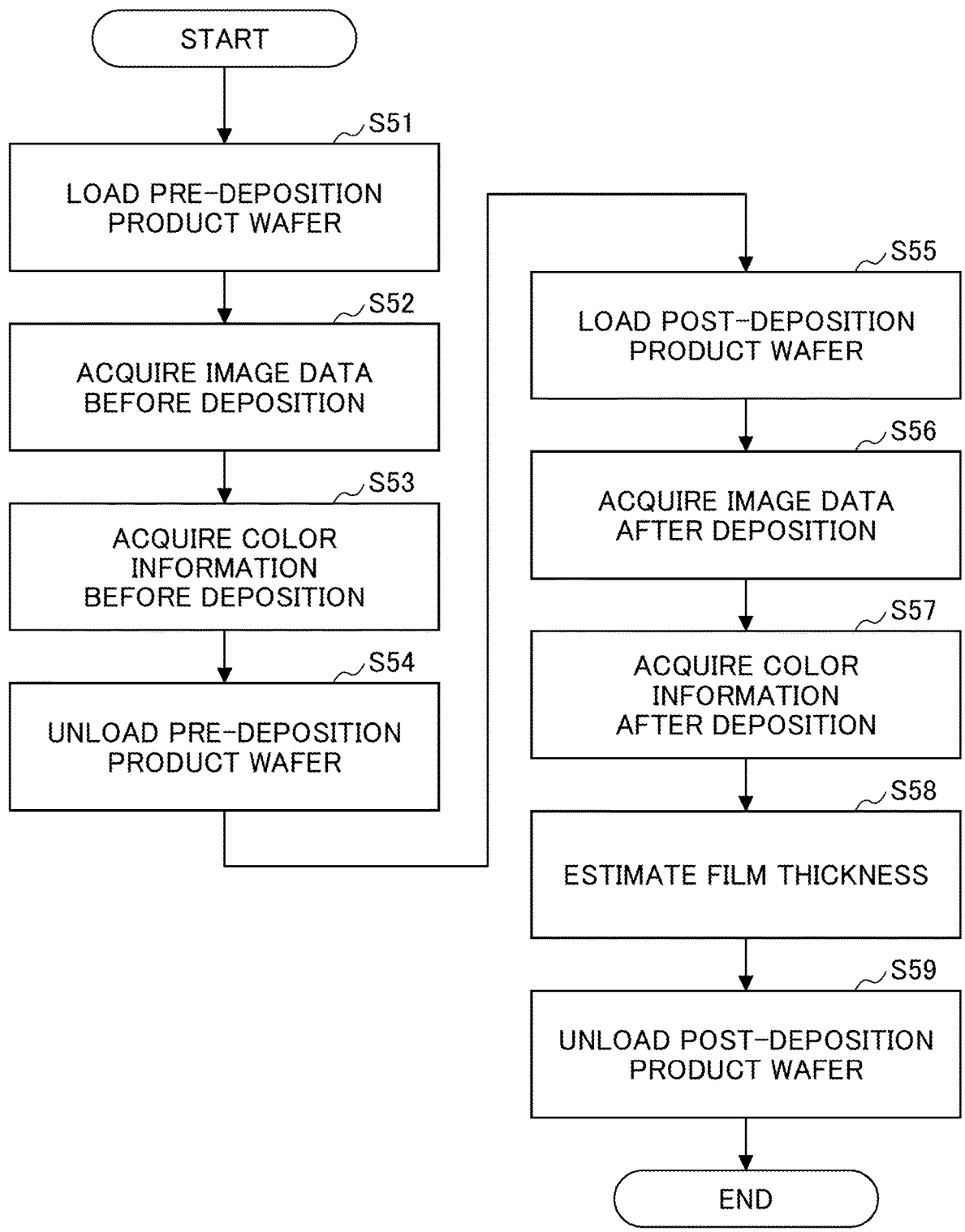
FIG. 11 is a flowchart illustrating an example of a process (measurement of film thickness on a product wafer) performed by the controller.
Figure 12:
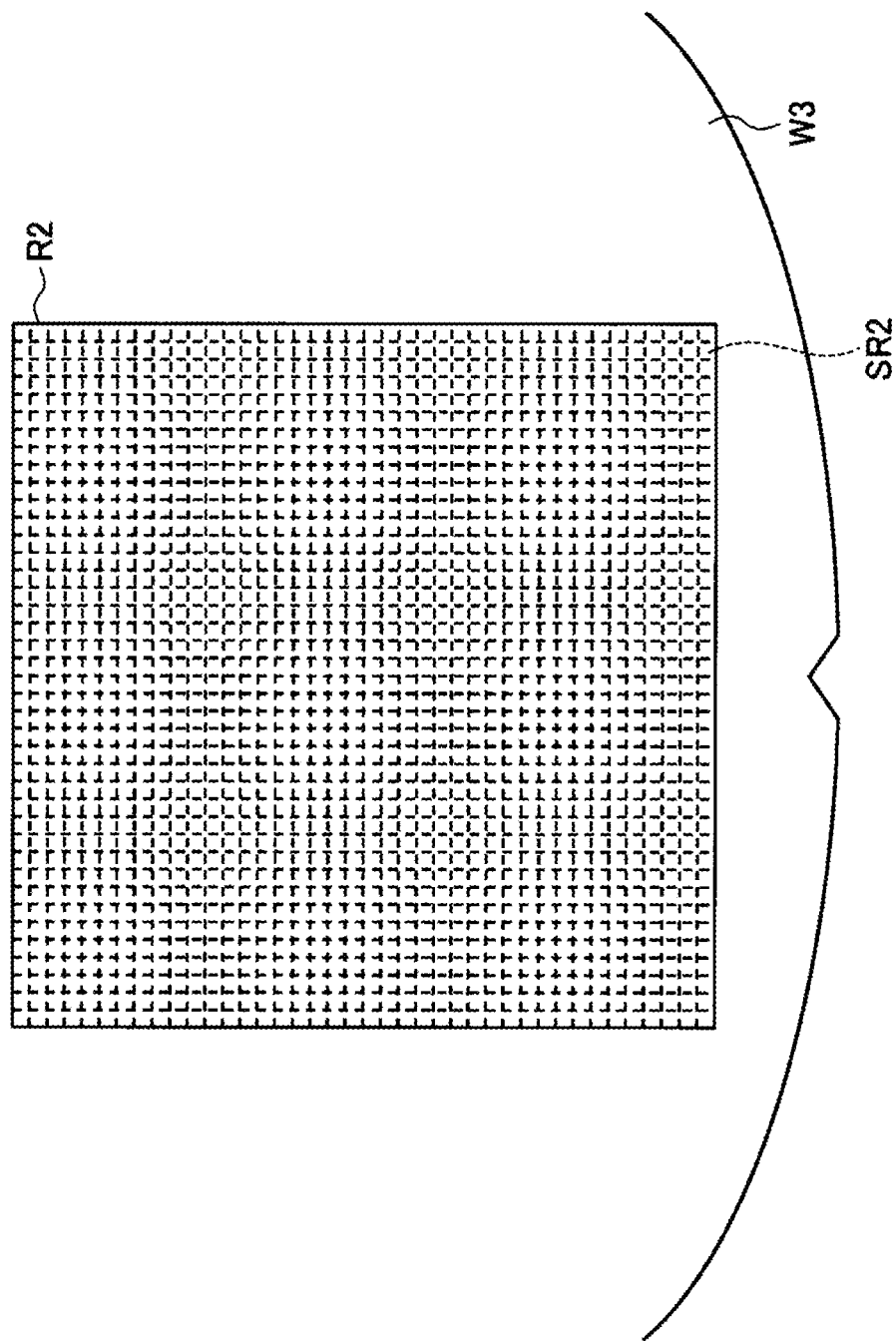
FIG. 12 is a diagram illustrating an example of a region from which color information of the product wafer is acquired.

The controller 100 measures the thickness of a silicon nitride film formed on the product wafer, after the controller 100 has acquired the reference data and the calibration data in accordance with the above-described method. FIG. 11 is a flowchart illustrating an example of a process (measurement of a film thickness on a product wafer) performed by the controller 100. FIG. 12 is a diagram illustrating an example of a region on a product wafer, from which color information is acquired.

The film thickness measuring unit 101 of the controller 100 performs step S51. In step S51, a product wafer W3 (e.g., FIG. 12) on which a pattern is formed is loaded into the film thickness measuring unit U3. In the initial state of the product wafer W3 (i.e., when step S51 is performed), a film to be measured (e.g., silicon nitride film) is not formed on the product wafer W3. Hereinafter, the product wafer W3 on which a film to be measured has not been formed is referred to as a pre-deposition product wafer W3. The pre-deposition product wafer W3 is held by the holder 31. The product wafer W3 is an example of a third substrate.

Next, the product image data acquiring unit 107 of the controller 100 executes step S52. In step S52, an image of the surface of the pre-deposition product wafer W3 is captured using the imaging device 33. Specifically, the image of the surface of the pre-deposition product wafer W3 is captured by the imaging device 33 while the holder 31 is moved in a predetermined direction by the actuator 32. Accordingly, the image data before deposition, pertaining to the surface of the pre-deposition product wafer W3, is acquired by the imaging device 33. The image data before deposition pertaining to the surface of the pre-deposition product wafer W3 may also be referred to as the "image data before deposition of the pre-deposition product wafer W3". The image data before deposition of the pre-deposition product wafer W3 is retained in the product image data acquiring unit 107 of the controller 100.

Next, the product color information acquiring unit 108 of the controller 100 executes step S53. In step S53, as illustrated in FIG. 12, for each second sub-region SR2 in the product wafer W3 corresponding to one of the multiple first sub-regions SR1, color information before deposition of the pre-deposition product wafer W3 included in the image data before deposition of the pre-deposition product wafer W3 is acquired. As the color information before deposition of the pre-deposition product wafer W3, the product color information acquiring unit 108 acquires, for example, luminance of R (red), G (green), and B (blue). The color information before deposition of the pre-deposition product wafer W3 is retained in the product color information acquiring unit 108 of the controller 100.

Next, the film thickness measuring unit 101 of the controller 100 performs step S54. In step S54, the pre-deposition product wafer W3 is unloaded from the film thickness measuring unit U3. On the pre-deposition product wafer W3 having been unloaded from the film thickness measuring unit U3, a film to be measured is formed by one of the process modules $PM_1$ to $PM_4$. Hereinafter, the product wafer W3 on which a film to be measured (e.g., silicon nitride film) is formed is referred to as a post-deposition product wafer W3. The silicon nitride film formed on the product wafer W3 is an example of a third film.

Next, the film thickness measuring unit 101 of the controller 100 performs step S55. In step S55, one post-deposition product wafer W3 is loaded into the film thickness measuring unit U3. The post-deposition product wafer W3 is held by the holder 31.

Next, the product image data acquiring unit 107 of the controller 100 executes step S56. In step S56, an image of the surface of the post-deposition product wafer W3 is captured by using the imaging device 33. Specifically, the image of the surface of the post-deposition wafer W3 is captured by the imaging device 33 while the holder 31 is moved in a predetermined direction by the actuator 32. Accordingly, the image data after deposition pertaining to the surface of the post-deposition product wafer W3 is acquired by the imaging device 33. The image data after deposition pertaining to the surface of the post-deposition product wafer W3 may also be referred to as the "image data after deposition of the post-deposition product wafer W3". The image data after deposition of the post-deposition product wafer W3 is retained in the product image data acquiring unit 107 of the controller 100. The image data after deposition of the post-deposition product wafer W3 is an example of second image data.

Next, the product color information acquiring unit 108 of the controller 100 executes step S57. In step S57, similar to the acquisition of color information before deposition of the pre-deposition product wafer W3, color information after deposition of the post-deposition product wafer W3 included in the image data after deposition of the post-deposition product wafer W3 is acquired for each of the second sub-regions SR2. As the color information after deposition of the post-deposition product wafer W3, the product color information acquiring unit 108 acquires, for example, luminance of R (red), G (green), and B (blue). The color information after deposition of the post-deposition product wafer W3 is retained in the product color information acquiring unit 108 of the controller 100. The color information after deposition of the post-deposition product wafer W3 is an example of second color information.

Next, the film thickness estimating unit 110 of the controller 100 performs step S58. In step S58, based on the correlation retained in the correlation acquiring unit 106 and based on the color information before deposition of the pre-deposition product wafer W3 and the color information after deposition of the post-deposition product wafer W3, which are retained in the product color information acquiring unit 108, the thickness of the silicon nitride film formed on the post-deposition product wafer W3 is estimated. The thickness of the silicon nitride film is estimated for each of the second regions R2.

As a result of performing the process of acquiring the calibration data illustrated in FIG. 10, for each of the first sub-regions SR1 in the (post-deposition) calibration wafer W2, Equation 1, which represents the correlation between the film thickness and calibration color information has been obtained. In step S58, first, luminance difference values of R (red), G (green), and B (blue) are calculated for each of the second sub-regions SR2 of all of the second regions R2, by using the color information before deposition of the pre-deposition product wafer W3 and the color information after deposition of the post-deposition product wafer W3 retained in the product color information acquiring unit 108. Next, for each of the second sub-regions SR2, an estimated value (i.e., film thickness) is calculated using Equation 1 and the luminance difference values of R (red), G (green), and B (blue) of the corresponding second sub-region SR2. In the following description, the value calculated using Equation 1 and the luminance difference values of R (red), G (green), and B (blue) of a second sub-region SR2 is referred to as the "estimated film thickness of the second sub-region SR2". When calculating an estimated film thickness of a certain second sub-region SR2 of the multiple second sub-regions SR2 on the post-deposition product wafer W3, an equation (Equation 1) for the corresponding first sub-region SR1 (i.e., the sub-region SR1 corresponding to the certain second sub-region SR2) is selected, and luminance difference values of R (red), G (green), and B (blue) of the certain second sub-region SR2 are input to $x_1$, $x_2$, and $x_3$ of the selected equation (Equation 1) respectively. For each of the second sub-region SR2 in the (post-deposition) calibration wafer W2, estimation of the film thickness is performed. Next, film thicknesses on the respective second regions R2 is estimated by using the estimated film thicknesses of the second sub-regions SR2. The film thickness on a certain second region R2 is estimated by calculating a weighted average of the estimated film thicknesses of all of the second sub-regions SR2 in the certain second region R2. Assume a case in which n (n is a natural number) number of second regions R2 are defined in the (post-deposition) product wafer W3 and each of the second regions R2 is composed of p number of the second sub-regions SR2 (p is a natural number). Also, the film thickness on the k-th second region R2 (i.e., weighted average of the estimated film thicknesses of all of the second sub-regions SR2) is denoted by $Y_k$ (k is an integer that satisfies $1 \leq k \leq n$). In this case, $Y_k$ is calculated by using the following equation (Equation 2).

$$Y_k = \frac{\sum_{i=1}^{p} \omega_{ki} y_{ki}}{\sum_{i=1}^{p} \omega_{ki}}. \qquad \text{(Equation 2)}$$

In Equation 2, $y_{ki}$ is the estimated film thickness of the i-th second sub-region SR2 in the k-th second region R2 (i is an integer ranging from 1 to p; p is the number of second sub-regions in a second region), and $\omega_{ki}$ is a weighing factor defined for each of the second sub-regions SR2. In one embodiment, a multiple correlation coefficient may be used as $\omega_{ki}$.

Next, the film thickness measuring unit 101 of the controller 100 performs step S59. In step S59, the post-deposition product wafer W3 is unloaded from the film thickness measuring unit U3. The unloaded post-deposition product wafer W3 is transferred to, for example, a processing module at a later stage.

As described above, the thickness of the film to be measured formed on the product wafer W3 is measured (estimated).

[Working Effect]

In the film thickness measuring unit U3, the film thickness on the reference wafer W1 on which a pattern is not formed is acquired (calculate) based on the spectral data measured from the reference wafer W1, color information is acquired from the image data of the surface of the calibration wafer W2 simulating the product wafer W3, and a correlation between the film thickness and the color information is obtained. When the thickness of the film to be measured formed on the product wafer W3 is measured, the color information is acquired from the image data of the surface of the product wafer W3, and the film thickness on the product wafer W3 is estimated by using the correlation between the film thickness and the color information. Accordingly, even if a pattern is formed on the product wafer W3, the thickness of the film to be measured can be measured with high accuracy without being affected by the position of a die on the product wafer W3. That is, the film thickness can be measured with high accuracy without recognizing a die on the product wafer W3.

Because the spectroscopic measurement device 40 is provided in the film thickness measuring unit U3, as compared to a case of using an ellipsometer provided outside the film thickness measuring unit U3 to acquire film thickness information, the film thickness of all wafers, including pre-deposition wafers W loaded into the substrate processing system 20 and the post-deposition wafers W subjected to deposition processing in the substrate processing system 20, can be measured without ejecting the wafers W from the substrate processing system 20.

In a case in which a film to be measured is relatively thin, the value of the film thickness measured by spectroscopic analysis may differ from a value of a film thickness measured by an ellipsometer. In such a case, for example, it is preferable to obtain a correlation between the value of the film thickness measured by spectroscopic analysis and the value of the film thickness measured by an ellipsometer in advance, maintain this correlation in the spectral information retaining unit 109, and use this correlation in estimating the film thickness (in step S23).

Figure 13:
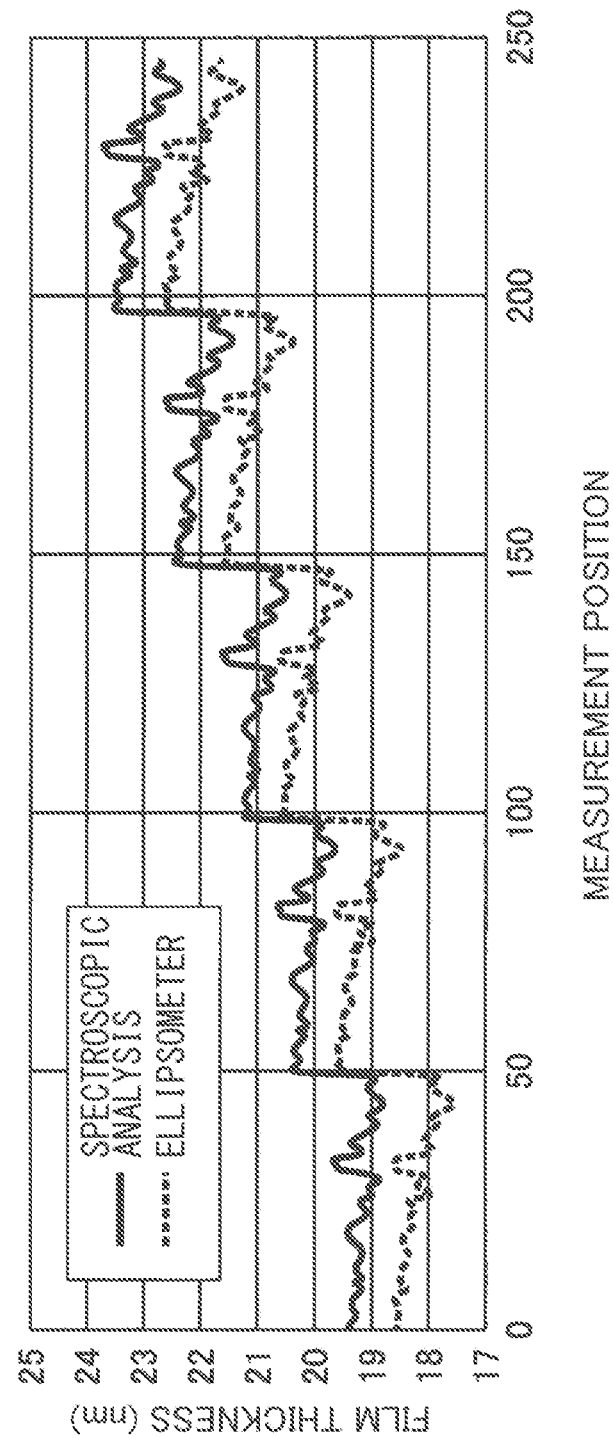
FIG. 13 is a diagram illustrating an example of a result of measuring the film thickness on a wafer.
Figure 14:
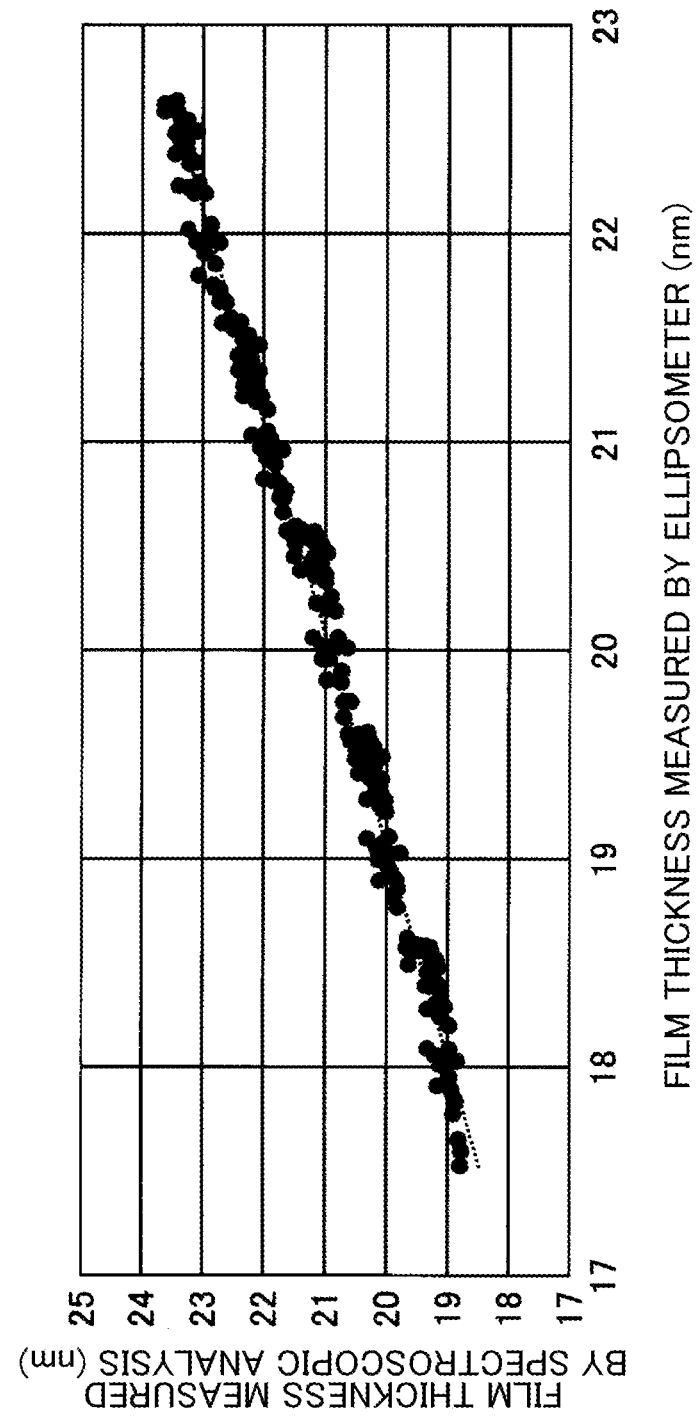
FIG. 14 is a diagram illustrating the relationship between the film thickness measured using an ellipsometer and the film thickness measured by spectroscopic analysis.

FIG. 13 is a diagram illustrating an example of results of measuring the film thicknesses on wafers. In this measurement, five samples S11 to S15, each being a bare wafer having a silicon nitride film with different film thickness, were prepared. For each of the samples S11 to S15, measurement of the film thicknesses by using spectroscopic analysis and measurement of the film thicknesses by using an ellipsometer were performed at 49 measurement locations (first positions). In FIG. 13, the measured film thicknesses by using spectroscopic analysis is illustrated by a solid line curve, and the measured film thicknesses by using an ellipsometer is illustrated by a dashed line curve. The horizontal axis in FIG. 13 indicates an identification number of the measurement location. 1-49 on the horizontal axis indicate measurement locations in the sample S11, 50-98 on the horizontal axis indicate measurement locations in the sample S12, 99-147 on the horizontal axis indicate measurement locations in the sample S13, 148-196 on the horizontal axis indicate measurement locations in the sample S14, and 197-245 on the horizontal axis indicate measurement locations in the sample S15. The vertical axis in FIG. 13 indicates the film thickness. FIG. 14 is a diagram illustrating the relationship between the film thickness measured using an ellipsometer and the film thickness measured using spectroscopic analysis. The horizontal axis of FIG. 14 illustrates the film thickness measured using an ellipsometer, and the vertical axis of FIG. 14 indicates the film thickness measured using spectroscopic analysis. In FIG. 14, illustrates measurement results with respect to 245 measurement locations.

In the example illustrated in FIGS. 13 and 14, in all of the samples S11 to S15, a constant difference was observed at each measurement location between the film thickness measured by spectroscopic analysis and the film thickness measured by an ellipsometer. When the correlations illustrated in FIG. 14 were approximated by a linear equation, the root mean square error (RMSE) was 0.16 nm.

Figure 15A:
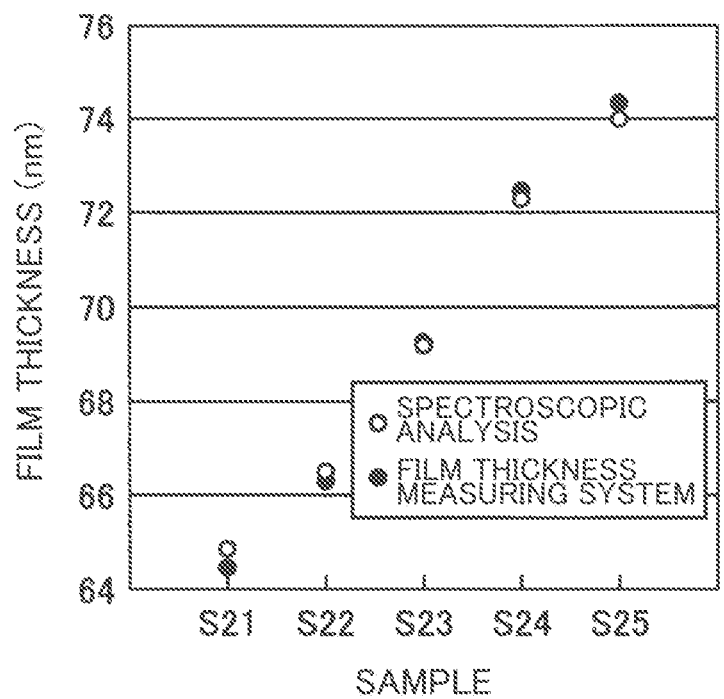
FIGS. 15A and 15B are diagrams illustrating examples of results of the film thickness measurement.
Figure 15B:
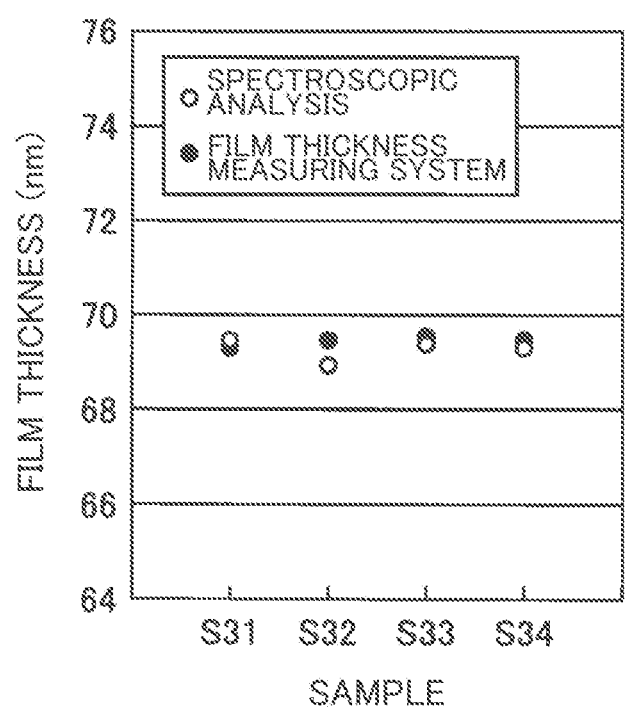

Next, an example of measuring product wafers in which a pattern is formed will be described. In this example, five sets of reference wafers W1 and calibration wafers W2 were used to acquire calibration data, and film thicknesses of four product wafers W3 were estimated using the calibration data. Specifically, for each of the five calibration wafers W2 (samples S21-S25) and the four product wafers W3 (samples S31-S34), thicknesses of the film to be measured (silicon nitride film) were measured at 49 measurement locations (first positions). FIGS. 15A and 15B are diagrams illustrating examples of results of the film thickness measurement. FIG. 15A illustrates a result of film thickness measurement for the five calibration wafers W2 (samples S21-S25), and FIG. 15B illustrates a result of film thickness measurement for the four product wafers W3 (samples S31-S34). The five open circles in FIG. 15A indicate the average film thicknesses of the silicon nitride films on the five samples S21-S25, respectively, which are measured by spectroscopic analysis. The five filled circles in FIG. 15A indicate the average film thicknesses of the silicon nitride films on the five samples S21-S25 respectively, which are measured (estimated) by using the film thickness measurement system according to the above-described embodiment. The four open circles in FIG. 15B indicate the average film thicknesses of the silicon nitride films on the four samples S31-S34, respectively, which are measured by spectroscopic analysis. The four filled circles in FIG. 15B indicate the average film thicknesses of the silicon nitride films on the four samples S31-S34 respectively, which are measured (estimated) using the film thickness measurement system according to the above-described embodiment. The horizontal axis in each of FIGS. 15A and 15B indicates the identification number of the samples. The vertical axis in each of FIGS. 15A and 15B indicates the measurement result of the film thickness.

In the example illustrated in FIGS. 15A and 15B, with respect to not only the calibration wafers W2 (samples S21-S25) but also the product wafers W3 (samples S31-S34), a difference between the average film thickness of the silicon nitride film measured by using the film thickness measurement system according to the above-described embodiment and the average film thickness of the silicon nitride film measured by spectroscopic analysis is extremely small.

Figure 16:
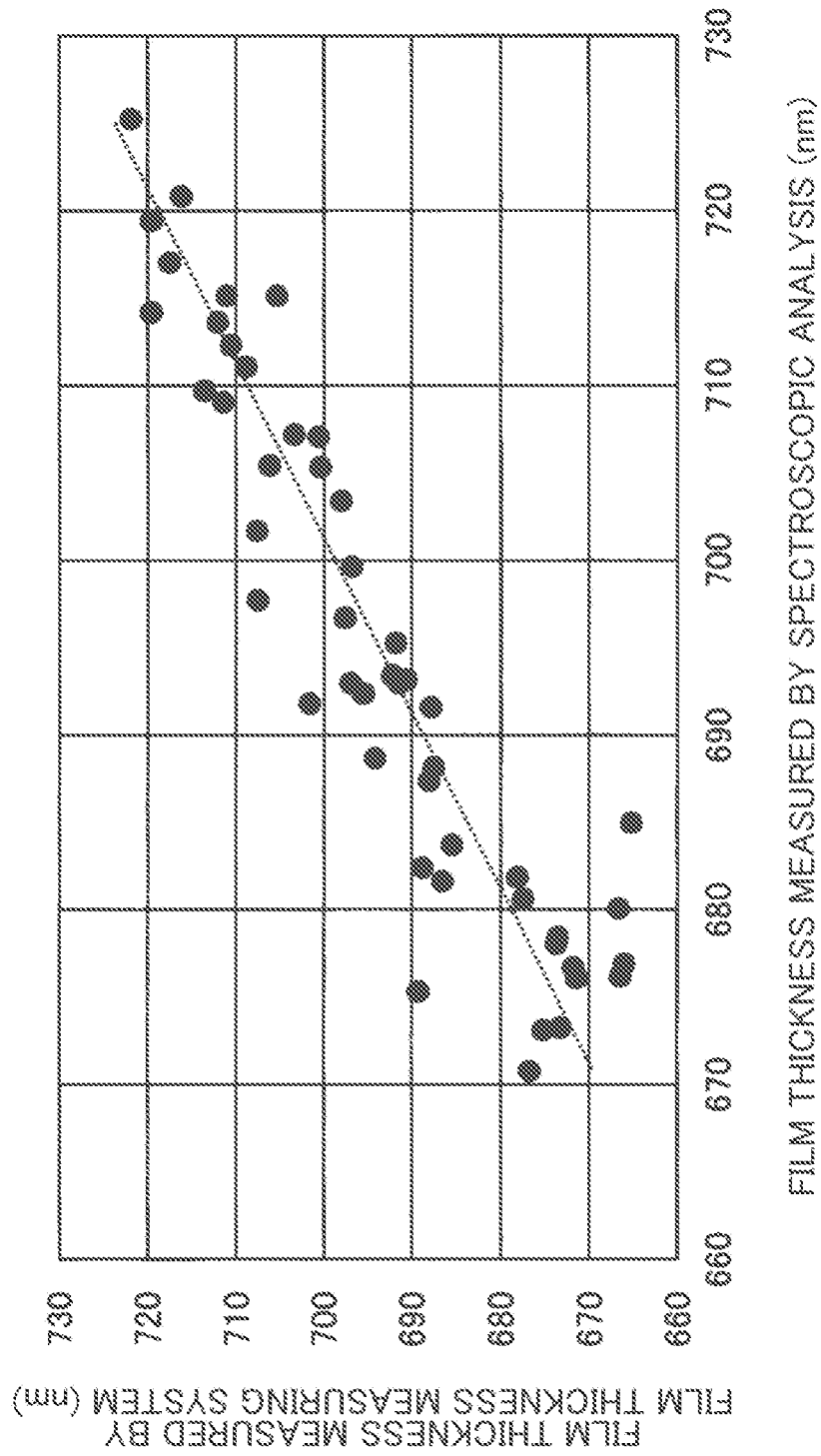
FIG. 16 is a diagram illustrating another example of the result of the film thickness measurement.

FIG. 16 is a diagram illustrating an example of the measurement result of the film thickness in the sample S34. The horizontal axis of FIG. 16 indicates the film thickness measured by spectroscopic analysis, and the vertical axis of FIG. 16 indicates the film thickness measured using the film thickness measurement system according to the above-described embodiment. FIG. 16 illustrates the results of 49 measurement locations. With respect to the sample S34, the correlation illustrated in FIG. 16 was approximated by a linear equation, and the root mean square error (RASE) was 0.6 nm.

It should be noted that the light source 44 and the incident portion 41 may be configured as an integrated component.

For example, the film thickness measuring system 1 can be incorporated into a deposition apparatus in which deposition and film thickness measurement are performed. Examples of the deposition apparatus include a coater/developer, a chemical vapor deposition (CVD) device, a sputtering device, a vapor deposition device, and an atomic layer deposition (ALD) devices. The film thickness measuring system may be embedded in, for example, an etching apparatus in which etching and film thickness measurement are performed. Examples of the etching apparatus include a plasma etching device and an atomic layer etching (ALE) device. Further, the film thickness measuring system 1 is not required to be disposed in the deposition apparatus or the etching apparatus. The film thickness measuring system 1 may be disposed independently of the deposition apparatus or the etching apparatus, and measurement results may be transmitted to the deposition apparatus or the etching apparatus.

The film thickness measuring system 1 is not required to include the spectroscopic measurement device 40, and the spectral data acquiring unit 102 may be configured to acquire spectral data separately from the film thickness measuring system 1.

Although an example embodiment has been described in detail above, various modifications and substitutions may be made to the above-described embodiment without departing from the scope of the claims.

What is claimed is:
1. A film thickness measuring system comprising:
a holder configured to hold a substrate;
an imaging device configured to capture image data of a surface of the substrate held by the holder; and
a controller configured to
receive, for each of N number of first substrates having respective first films with different thicknesses (N is an integer greater than 1), spectral data of light reflected at a first position on a surface of a corresponding first substrate of the first substrates;
calculate a thickness of each of the first films at the first position by using the spectral data;

cause the imaging device to capture first image data of surfaces of N number of second substrates on which second films are formed, the second films having substantially same thicknesses as the respective first films;

acquire, for each of the N number of second substrates, first color information of a plurality of first sub-regions in a first region by using the first image data, the first region including a second position corresponding to the first position;

calculate, for each of the plurality of first sub-regions, a correlation between a film thickness and color information, using the calculated thickness of each of the first films at the first location as the thickness of each of the second films in the first region and by using the first color information of the N number of second substrates;

cause the imaging device to capture second image data of a surface of a third substrate on which a third film is formed;

acquire second color information of a plurality of second sub-regions in a second region on the third substrate by using the second image data, the second region corresponding to the first region, and the plurality of second sub-regions corresponding to the plurality of first sub-regions; and estimate a thickness of the third film in the second region, by using the calculated correlation and the second color information of the plurality of second sub-regions.

2. The film thickness measuring system according to claim 1, further comprising a spectroscopic measurement device configured to separate light reflected at a surface of a substrate held by the holder, wherein the controller is configured to control the spectroscopic measurement device, to receive the spectral data from the spectroscopic measurement device.

3. The film thickness measuring system according to claim 1, wherein each of the first substrates is provided with a plurality of third positions;

each of the second substrate is provided with a plurality of fourth positions corresponding to the third positions, the plurality of fourth positions being included in a plurality of third regions of each of the second substrate, and each of the plurality of third regions including a plurality of third sub-regions;

each of the third substrate includes a plurality of fourth regions corresponding to the plurality of third regions, each of the plurality of fourth regions including a plurality of fourth sub-regions; and the controller is configured to calculate the thickness of each of the first films at the plurality of third positions by using the spectral data;

acquire, for each of the N number of second substrates, the first color information of the plurality of third sub-regions in the plurality of third regions by using the first image data;

calculate, for each of the plurality of third sub-regions of all of the plurality of the third region, the correlation between a film thickness and the color information;

acquire, for each of the fourth regions in the third substrate, the second color information of the plurality of fourth sub-regions by using the second image data; and estimate the thickness of the third film in each of the fourth regions.

4. The film thickness measuring system according to claim 1, wherein the controller is configured to estimate the thickness of the third film by calculating an estimated film thickness of each of the plurality of second sub-regions in the second region by using the calculated correlation of a corresponding first sub-region and the color information of the corresponding first sub-region; and calculating a weighted average of the estimated film thickness of each of the plurality of second sub-regions in the second region, as the thickness of the third film in the second region.

5. The film thickness measuring system according to claim 1, wherein the imaging device include an image sensor having a plurality of pixels, and the plurality of second sub-regions correspond to the respective pixels of the image sensor.

6. A method of measuring a film thickness comprising:

receiving, for each of N number of first substrates having respective first films with different thicknesses (N is an integer greater than 1), spectral data of light reflected at a first position on a surface of a corresponding first substrate of the first substrates;

calculating a thickness of each of the first films at the first position by using the spectral data;

capturing first image data of surfaces of N number of second substrates on which second films are formed, the second films having substantially same thicknesses as the respective first films;

acquiring, for each of the N number of second substrates, first color information of a plurality of first sub-regions in a first region by using the first image data, the first region including a second position corresponding to the first position;

calculating, for each of the plurality of first sub-regions, a correlation between a film thickness and color information, using the calculated thickness of each of the first films at the first location as the thickness of each of the second films in the first region and by using the first color information of the N number of second substrates;

capturing second image data of a surface of a third substrate on which a third film is formed;

acquiring second color information of a plurality of second sub-regions in a second region on the third substrate by using the second image data, the second region corresponding to the first region, and the plurality of second sub-regions corresponding to the plurality of first sub-regions; and estimating a thickness of the third film in the second region, by using the calculated correlation and the second color information of the plurality of second sub-regions.

7. The method according to claim 6, wherein each of the first substrates is provided with a plurality of third positions;

each of the second substrate is provided with a plurality of fourth positions corresponding to the third positions, the plurality of fourth positions being included in a plurality of third regions of each of the second substrate, and each of the plurality of third regions including a plurality of third sub-regions;

each of the third substrate includes a plurality of fourth regions corresponding to the plurality of third regions, each of the plurality of fourth regions including a plurality of fourth sub-regions; and the calculating of the thickness of each of the first films includes calculating the thickness of each of the first films at the plurality of third positions by using the spectral data;

the acquiring of the first color information includes acquiring, for each of the N number of second substrates, first color information of the plurality of third sub-regions in the plurality of third regions by using the first image data;

the calculating of the correlation includes calculating, for each of the plurality of third sub-regions of all of the plurality of the third region, the correlation between a film thickness and the color information;

the acquiring of the second color information includes acquiring, for each of the fourth regions in the third substrate, second color information of the plurality of fourth sub-regions by using the second image data; and the estimating the thickness of the third film includes estimating a thickness of the third film in each of the fourth regions.

8. The method according to claim 6, wherein the thickness of the third film is estimated by calculating an estimated film thickness of each of the plurality of second sub-regions in the second region by using the calculated correlation of a corresponding first sub-region and the color information of the corresponding first sub-region; and calculating a weighted average of the estimated film thickness of each of the plurality of second sub-regions in the second region.

9. A non-transitory computer-readable recording medium storing a computer program to cause a processor in a computer to execute the method according to claim 6.

* * * * *